(12) United States Patent
Shirahata

(10) Patent No.: US 10,296,804 B2
(45) Date of Patent: May 21, 2019

(54) IMAGE RECOGNIZING APPARATUS, COMPUTER-READABLE RECORDING MEDIUM, IMAGE RECOGNIZING METHOD, AND RECOGNITION APPARATUS

(71) Applicant: FUJITSU LIMITED, Kawasaki-shi, Kanagawa (JP)

(72) Inventor: Koichi Shirahata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 15/628,105

(22) Filed: Jun. 20, 2017

(65) Prior Publication Data

US 2018/0032835 A1 Feb. 1, 2018

(30) Foreign Application Priority Data

Jul. 28, 2016 (JP) .................................. 2016-148965

(51) Int. Cl.
*G06K 9/62* (2006.01)
*G06K 9/46* (2006.01)
*G06N 20/00* (2019.01)
*G06N 3/08* (2006.01)

(52) U.S. Cl.
CPC ............. *G06K 9/46* (2013.01); *G06K 9/4628* (2013.01); *G06K 9/6217* (2013.01); *G06K 9/6267* (2013.01); *G06N 3/08* (2013.01); *G06N 20/00* (2019.01)

(58) Field of Classification Search
CPC ...... G06K 9/49; G06K 9/6217; G06K 9/6267; G06N 9/005; G06N 3/08
See application file for complete search history.

(56) References Cited

U.S. PATENT DOCUMENTS

| 2010/0215253 | A1 | 8/2010 | Yamamoto et al. | |
| 2011/0239224 | A1 | 9/2011 | Yamamoto et al. | |
| 2015/0134583 | A1* | 5/2015 | Tamatsu ................... | G06N 3/08 706/25 |
| 2017/0011281 | A1* | 1/2017 | Dijkman .................. | G06K 9/66 |

(Continued)

FOREIGN PATENT DOCUMENTS

JP 2008-310524 12/2008

OTHER PUBLICATIONS

Song Han et al., "Deep Compression: Compressing Deep Neural Networks with Pruning, Trained Quantization and Huffman Coding", arXiv:1510.00149v5 [cs.CV], Feb. 15, 2016, pp. 1-14 (14 pages).

(Continued)

*Primary Examiner* — Kevin Ky
(74) *Attorney, Agent, or Firm* — Fujitsu Patent Center

(57) ABSTRACT

An image recognizing apparatus includes a processor that controls first and second learning processes, the first learning process in second layers including holding, based on a large/small relation between neuron data size and parameter size of the second layer, in a memory area, an error gradient of parameters to be sent to the corresponding layer of the second layers; and the second learning process between first layers including holding, in a memory area of each first layers, an error gradient of parameters to be sent to the corresponding layer of the first layers, which is computed based on the error gradient or an error gradient of a previous layer of the first layers, based on a large/small relation between neuron data size and parameter size of the first layer.

6 Claims, 17 Drawing Sheets

(56) References Cited

U.S. PATENT DOCUMENTS

| | | | |
|---|---|---|---|
| 2017/0039456 A1* | 2/2017 | Saberian | G06N 3/08 |
| 2017/0103321 A1* | 4/2017 | Henry | G06F 15/82 |
| 2017/0221176 A1* | 8/2017 | Munteanu | G06T 1/60 |
| 2017/0304732 A1* | 10/2017 | Velic | G06K 9/00201 |
| 2017/0316311 A1* | 11/2017 | Pilly | G06K 9/6272 |
| 2017/0344882 A1* | 11/2017 | Ambrose | G06F 3/0604 |
| 2017/0372174 A1* | 12/2017 | Wshah | G06K 9/6256 |
| 2018/0039886 A1* | 2/2018 | Umuroglu | G06N 3/04 |

OTHER PUBLICATIONS

Takayuki Okatani, "Deep Learning for Image Recognition", Graduate School of Information Sciences, Tohoku University (2013), English translation (40 pages).

Léon Bottou, Stochastic Gradient Descent Tricks, Microsoft Research, Redmond, WA (2012), (16 pages).

Karen Simonyan et al., "Very Deep Convolutional Networks for Large-Scale Image Recognition", arXiv:1409.1556v616 [cs.CV], Apr. 2015, pp. 1-14 (14 pages).

Paul A. Merolla et al., "A Million Spiking-Neuron Integrated Circuit with a Scalable Communication Network and Interface", Supplementary Material, IBM Research, San Jose, CA (2014) (40 pages).

Yunji Chen et al., "DaDian Nao: A Machine-Learning Supercomputer", SKL of Computer Architecture, ICT, CAS, China, et al. (2014) (14 pages).

\* cited by examiner

FIG.5

| Layer | NEURON DATA (IN RECOGNITION) | PARAMETER (IN RECOGNITION) | NEURON DATA (IN LEARNING) | PARAMETER (IN LEARNING) |
|---|---|---|---|---|
| Input | 64x1x28x28=50,176 | 0 | 64x1x28x28=50,176 | 0 |
| Convolution1 | 64x20x24x24=737,280 | 1x20x5x5=500 | 64x20x24x24=737,280 | 1x20x5x5=500 |
| Pooling1 | 64x20x12x12=184,320 | 0 | 64x20x12x12=184,320 | 0 |
| Convolution2 | 64x50x8x8=204,800 | 20x50x5x5=25,000 | 64x50x8x8=204,800 | 20x50x5x5=25,000 |
| Pooling2 | 64x50x4x4=51,200 | 0 | 64x50x4x4=51,200 | 0 |
| Fully-Connected1 | 64x500=32,000 | (50x4x4)x500=400,000 | 64x500=32,000 | (50x4x4)x500=400,000 |
| Fully-Connected2 | 64x10=640 | 500x10=5,000 | 64x10=640 | 500x10=5,000 |
| Softmax | 64x10=640 | 0 | 64x10=640 | 0 |
| Total | 1.26Mx4bytes=5.04MB | 431Kx4bytes=1.72MB | 1.26Mx4bytes=5.04MB | 431Kx4bytes=1.72MB |

FIG.8

| Layer | NEURON DATA (IN RECOGNITION) | PARAMETER (IN RECOGNITION) | NEURON DATA (IN LEARNING) | PARAMETER (IN LEARNING) |
|---|---|---|---|---|
| Input | 64x1x28x28=50,176 | 0 | 64x1x28x28=50,176 | 0 |
| Convolution1 (GROUP A) | 64x20x24x24=737,280 | 1x20x5x5=500 | 0 | 1x20x5x5=500 |
| Pooling1 (GROUP C) | 64x20x12x12=184,320 | 0 | 0 | 0 |
| Convolution2 (GROUP A) | 64x50x8x8=204,800 | 20x50x5x5=25,000 | 0 | 20x50x5x5=25,000 |
| Pooling2 (GROUP C) | 64x50x4x4=51,200 | 0 | 0 | 0 |
| Fully-Connected1 (GROUP B) | 64x500=32,000 | (50x4x4)x500=400,000 | 64x500=32,000 | 0 |
| Fully-Connected2 (GROUP B) | 64x10=640 | 500x10=5,000 | 64x10=640 | 0 |
| Softmax (GROUP C) | 64x10=640 | 0 | 0 | 0 |
| Total | 1.26Mx4bytes=5.04MB | 431Kx4bytes=1.72MB | 3.26Kx4bytes=13.04KB | 25.5Kx4bytes=1.02MB |

FIG.12

| Layer | NEURON DATA (IN RECOGNITION) | PARAMETER (IN RECOGNITION) | NEURON DATA (IN LEARNING) | PARAMETER (IN LEARNING) | ERROR OF PREVIOUS CYCLE |
|---|---|---|---|---|---|
| Input | 50176 | 0 | 50176 | 0 | 0 |
| Convolution1 | 737280 | 500 | 737280 | 500 | 500 |
| Pooling1 | 184320 | 0 | 184320 | 0 | 0 |
| Convolution2 | 204800 | 25000 | 204800 | 25000 | 25000 |
| Pooling2 | 51200 | 0 | 51200 | 0 | 0 |
| Fully-Connected1 | 32000 | 400000 | 32000 | 400000 | 400000 |
| Fully-Connected2 | 640 | 5000 | 640 | 5000 | 5000 |
| Softmax | 640 | 0 | 640 | 0 | 0 |
| Total | 1261056 | 430500 | 1261056 | 430500 | 430500 |
| TOTAL IN BATCH SIZE | =5044224 | =1722000 | =5044224 | =1722000 | =1722000 |
| COMPREHENSIVE TOTAL | 5044224+1722000 +5044224+1722000 +1722000 =15254448 | | | | |

FIG.14

| Layer | NEURON DATA (IN RECOGNITION) | PARAMETER (IN RECOGNI-TION) | NEURON DATA (IN LEARN-ING) | PARAMETER (IN LEARN-ING) | ERROR OF PREVI-OUS CYCLE |
|---|---|---|---|---|---|
| Input | 50176 | 0 | 0 | 0 | 0 |
| Convolution1 | 737280 | 500 | 0 | 500 | 500 |
| Pooling1 | 184320 | 0 | 0 | 0 | 0 |
| Convolution2 | 204800 | 25000 | 0 | 25000 | 25000 |
| Pooling2 | 51200 | 0 | 0 | 0 | 0 |
| Fully-Connected1 | 32000 | 400000 | 32000 | 0 | 400000 |
| Fully-Connected2 | 640 | 5000 | 640 | 0 | 5000 |
| Softmax | 640 | 0 | 0 | 0 | 0 |
| Total | 1261056 | 430500 | 32640 | 25500 | 430500 |
| TOTAL IN BATCH SIZE | =5044224 | =1722000 | =130560 | =102000 | =1722000 |
| COMPREHEN-SIVE TOTAL | 5044224+1722000 +232560+1722000 =8720784 | | | | | ated by executing a
IMAGE RECOGNIZING APPARATUS, COMPUTER-READABLE RECORDING MEDIUM, IMAGE RECOGNIZING METHOD, AND RECOGNITION APPARATUS

CROSS-REFERENCE TO RELATED APPLICATION

This application is based upon and claims the benefit of priority of the prior Japanese Patent Application No. 2016-148965, filed on Jul. 28, 2016, the entire contents of which are incorporated herein by reference.

FIELD

The embodiments discussed herein are related to an image recognizing apparatus, a computer-readable recording medium, an image recognizing method, and a recognition apparatus.

BACKGROUND

Recently, a machine learning using a neural network having a multi-layer structure has attracted attention. Such a machine learning using a neural network having a multi-layer structure is also called "deep learning". In the deep learning, a multi-hierarchization of the neural network has proceeded, and effectiveness thereof is confirmed in many fields. For example, the deep learning exerts a high recognition accuracy, which is comparable to that of human beings, in recognizing an image and a sound.

Patent document 1: Japanese Laid-open Patent Publication No. 2008-310524

The deep learning performs a supervised learning to cause the neural network to automatically learn features. However, a used memory amount of the deep learning is large because of the multi-hierarchization of the neural network, and thus the used memory amount is more increased in learning. For example, an error backward propagation method, which is commonly used in the supervised learning, causes the neural network to propagate forward data for learning to perform recognition, and compares a recognized result with a correct answer to obtain errors. Moreover, the error backward propagation method causes the neural network to propagate the error from the correct answer of the recognized result in the inverse direction of that at the recognition so as to change parameters of respective hierarchies of the neural network. Thus, the used memory amount increases in learning. For example, because gradients of the error are saved in the learning, a data amount increases to more than twice of that in a case where only the recognition is performed, and the used memory amount increases in some cases to more than twice.

SUMMARY

According to an aspect of an embodiment, an image recognizing apparatus includes a processor that executes a process including: controlling a first recognizing process in first layers, the first recognizing process including: computing convolution amounts based on neuron data and parameters of an input image to hold the convolution amounts in each of first memory areas of the corresponding first layer; and obtaining thinned convolution amounts by executing a thinning process on the convolution amounts held in the first memory area to hold the thinned convolution amounts in a corresponding one of second memory areas; and controlling a second recognizing process in second layers, the second recognizing process including: obtaining output results by multiplying weights held in a corresponding one of third memory areas of the corresponding second layer by all of the thinned convolution amounts held in the corresponding one second memory area to hold the output results in a corresponding one of fourth memory areas; computing, for each of the first and second layers, a neuron data size that is a size of neuron data and a parameter size that is a size of a parameter; and controlling first and second learning processes, the first learning process in the second layers including: holding, in a fifth memory area, an error gradient of the output results computed based on the output results held in the fourth memory area; holding, in a sixth memory area of each layer of the second layers, an error gradient to be sent to the corresponding layer of the second layers, which is computed based on the error gradient of the output results held in the fifth memory area or an error gradient held in a sixth memory area of a previous layer of the second layers, based on a large/small relation between the neuron data size and the parameter size of the second layer; and then holding, in one of the third memory areas, an error gradient of parameters to be sent to the corresponding layer of the second layers, and the second learning process between the first layers including: holding, in a seventh memory area of each first layers, an error gradient of parameters to be sent to the corresponding layer of the first layers, which is computed based on the error gradient held in the sixth memory area or an error gradient held in a seventh memory area of a previous layer of the first layers, based on a large/small relation between the neuron data size and the parameter size of the first layer; and then holding, in one of the second memory areas, an error gradient to be sent to the corresponding layer of the first layers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating one example of a conventional used memory amount;

FIG. 8 is a diagram illustrating one example of a memory amount used by the recognition apparatus according to the present embodiment;

FIG. 12 is a diagram illustrating one example of a conventional used memory amount;

FIG. 14 is a diagram illustrating one example of a memory amount used by the recognition apparatus according to the present embodiment.

DESCRIPTION OF EMBODIMENTS

Preferred embodiments of the present invention will be explained with reference to accompanying drawings. In addition, the disclosed technology is not limited to the embodiments described below. Moreover, any of these embodiments may be appropriately combined within a consistent range.

[a] First Embodiment

Explanation of Conventional Deep Learning

Figure 1:
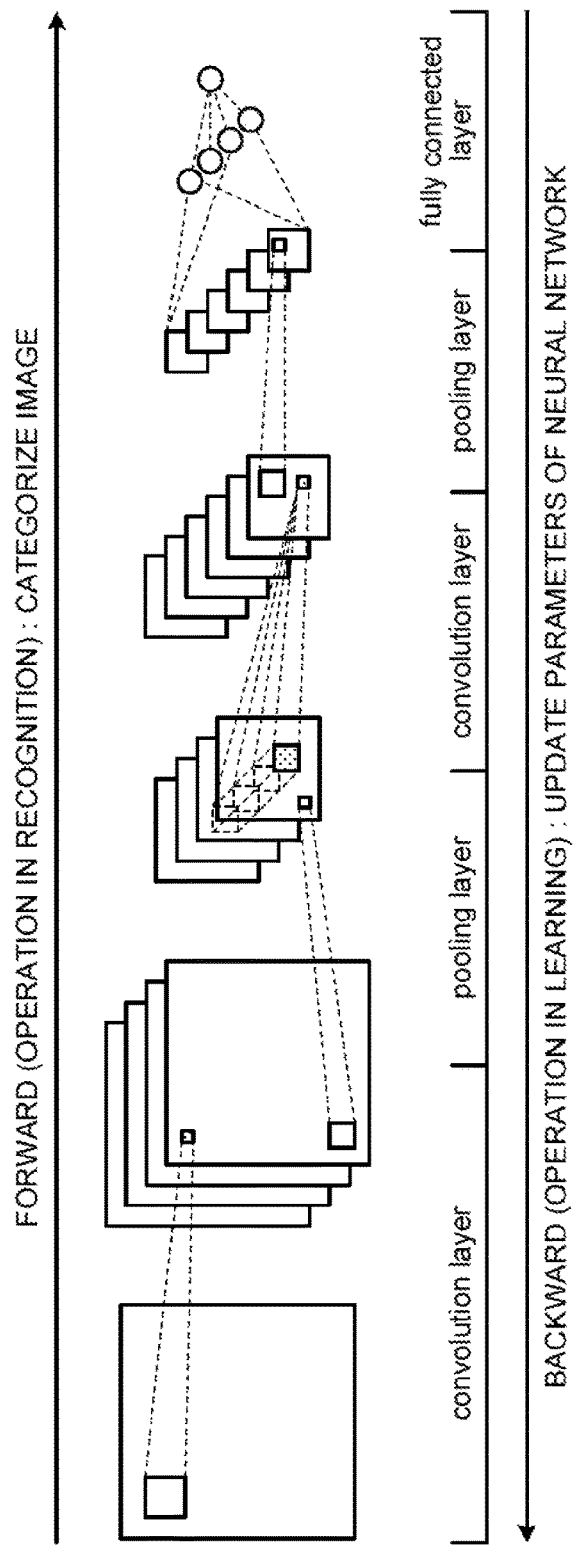
FIG. 1 is a diagram schematically illustrating one example of a process flow of a deep learning.

First, a conventional deep learning will be explained. FIG. 1 is a diagram schematically illustrating one example of a process flow of the deep learning. The deep learning performs supervised learning on a large amount of images, on which identification targets are imaged, by using the images as those for learning so as to cause a neural network to automatically learn features of the identification targets imaged on the images. The deep learning can identify the identification targets imaged on the images by using the neural network having learned the features in such a manner. There exists a lot of neurons (neuron cells) in a brain. Each neuron receives a signal from one neuron and sends the signal to another neuron. The brain executes various information processes in response to this signal flow. The neural network is a model that realizes characteristics of such functions of the brain on a computer. The neural network hierarchically connects units that imitate the neurons of the brain. The unit is also called a "node". Each unit receives data from one unit and sends the data to another unit. The neural network changes a parameter of the unit by learning to change data to be sent, and thus can identify (recognize) various identification targets. Hereinafter, data that is transmitted in the neural network is called "neuron data". In FIG. 1, as one example of the neural network, there is illustrated one example of a Convolutional Neural Network (CNN) used for recognition of the images. Hereinafter, a case will be explained as an example in which the neural network recognizes images by using the convolution neural network. The neural network has a hierarchical structure, and includes convolution layers, pooling layers (sub-sampling layers), and a fully-connected layer. In the example illustrated in FIG. 1, two convolution layers and two pooling layers are alternately provided, however, more layers may be provided. A plurality of fully-connected layers may be provided. The hierarchical structure of the neural network and configurations of the layers are preliminary set, by a designer, in accordance with the targets to be identified and the like.

When identifying an image, as illustrated in FIG. 1, the neural network alternately repeats from left to right the convolution layer and the pooling layer for a plurality of times so as to extract a feature of an identification target imaged on the image, and finally identifies (categorizes) the identification target imaged on the image in the fully-connected layer. On the other hand, when performing learning on the image, the neural network obtains errors from a correct answer of the identified result, and causes, as illustrated in FIG. 1, the neural network to perform a backward propagation from right to left so as to change parameters of hierarchies of the convolution neural network.

Figure 2A:
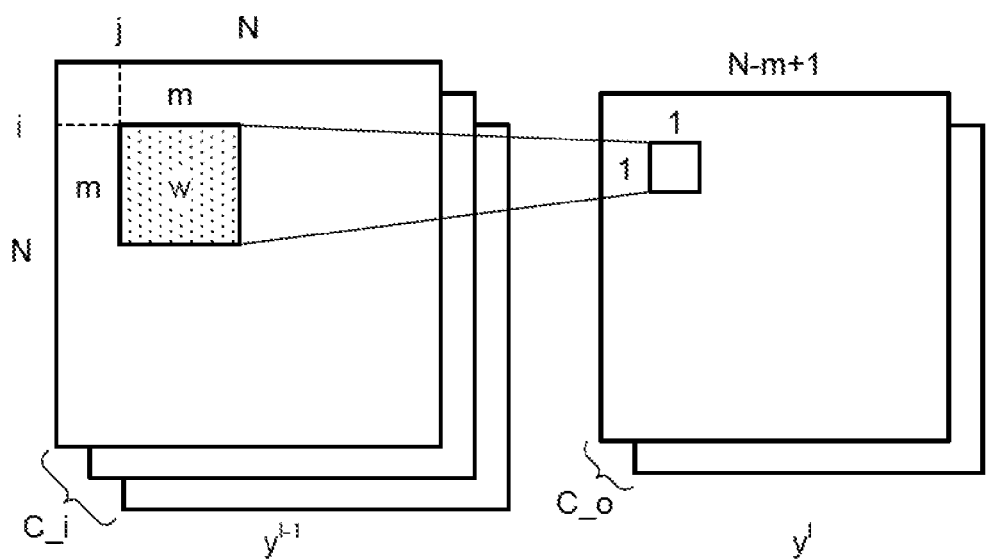
FIG. 2A is a diagram schematically illustrating one example of a convolution operation.

Next, an operation of each of the layers will be explained. The convolution layer performs a convolution operation on input neuron data. FIG. 2A is a diagram schematically illustrating one example of the convolution operation. The example illustrated in FIG. 2A illustrates a case where a convolution operation is performed on an input N×N-pixel image. The convolution layer uses values of pixels in the N×N-pixel image as respective neuron data, and computes convolutions by using m×m-size filters for which respective parameters are set so as to generate neuron data to be sent to the next layer. The convolution layer passes the neuron data to be output through a non-linear activation function σ so as to model the activation. The activation indicates a phenomenon in which a signal output from a neuron is transmitted to another neuron when a value of the signal to be output exceeds a certain value.

For example, the convolution layer performs a convolution operation of the following formula (1), and further performs, on the computed result, an operation of the non-linear activation function σ of the following formula (2).

$$x_{ij}^l = \sum_{a=0}^{m-l} \sum_{b=0}^{m-l} w_{ab} y_{(i+a)(j+b)}^{l-1} \quad (1)$$

$$y_{ij}^l = \sigma(x_{ij}^l) + b^l \quad (2)$$

Herein, $y_{(i+a)(j+b)}^{l-1}$ is a neuron datum to be input, and is a datum on a pixel at (i+a, j+b) in the N×N-pixel image $y^{l-1}$ illustrated in FIG. 2A. Moreover, $w_{ab}$ is a parameter that indicates each of weights of m×m filters w illustrated in FIG. 2A. Moreover, $x_{ij}^l$ is a datum on a pixel at (i, j) on which the convolution operation is performed. Herein, $x_{ij}^l$ is an output of a unit $U_i^l$ as a result of an application of the non-linear activation function σ to $x_{ij}^l$ and an addition of a predetermined bias $b^l$ thereto, and further is neuron data to be an input to the next layer.

Figure 2B:
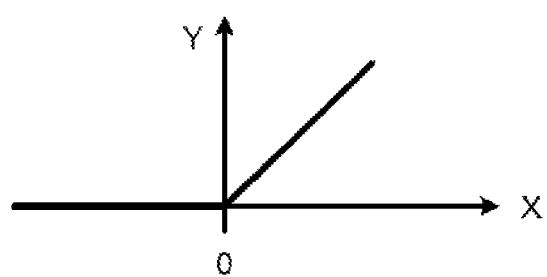
FIG. 2B is a diagram schematically illustrating one example of a Rectified Linear Unit.

For example, a Rectified Linear Unit (ReLU: ramp function) can be employed as the non-linear activation function σ. FIG. 2B is a diagram schematically illustrating one example of the ReLU. In the example illustrated in FIG. 2B, when an input X is less than zero, zero is output to an output Y. When the input X exceeds zero, a value of the input X is output to the output Y.

Figure 2C:
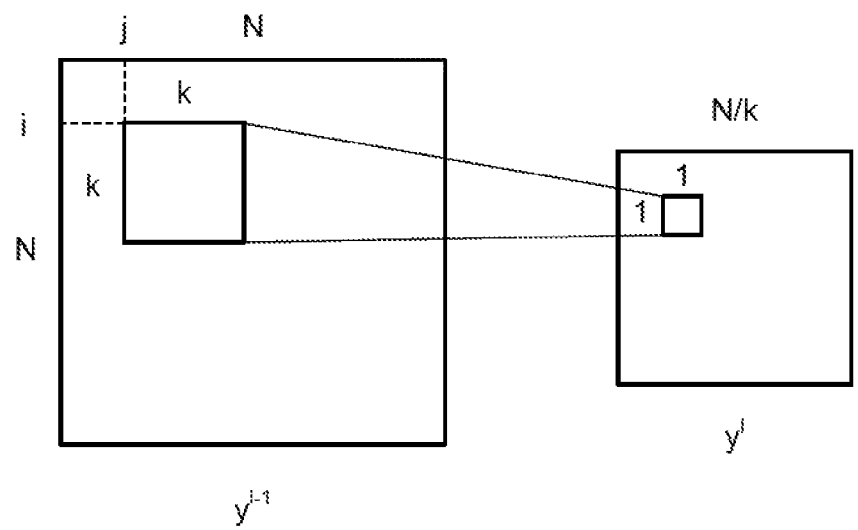
FIG. 2C is a diagram schematically illustrating one example of thinning.

The pooling layer performs thinning on the input neuron data. FIG. 2C is a diagram schematically illustrating one example of the thinning. For example, an N×N-pixel image is input as neuron data. The pooling layer thins the N×N-pixel neuron data to obtain N/k×N/k neuron data. For example, the pooling layer performs the thinning by Max-Pooling that takes a maximum value from each k×k area.

The thinning may be performed by any other method. For example, the thinning may be performed by Average-Pooling that takes an average value of the k×k area. The pooling layer may partially overlap the k×k areas to be thinned with each other, or may adjacently arrange the k×k areas without overlapping them so as to perform the thinning.

For example, the pooling layer performs Max-Pooling of the following formula (3).

$$y_{i,j}^l = \max(\{y_{i+a,j+b}^{l-1} | a,b \in [0,k-1]\}) \quad (3)$$

Herein, the function "max" is a function that outputs a neuron datum of a maximum value in an area having k-pixel ranges from a pixel of (i, j) illustrated in FIG. 2C. Moreover, $y_{i,j}^l$ is neuron data that is an output from the unit $U_i^l$.

The fully-connected layer performs an operation of fully connecting that fully connects the input neuron data in accordance with the number of targets to be identified. For example, an N×N-pixel image is input as neuron data. The fully-connected layer multiplies each N×N-pixel neuron datum by each weight (parameter) to generate neuron data to be output to the next layer. The fully-connected layer passes the neuron data to be output through the non-linear activation function σ so as to model an activation.

Figure 2D:
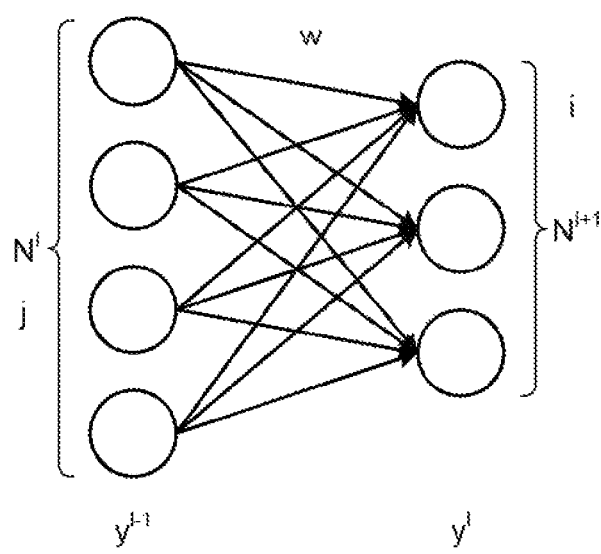
FIG. 2D is a diagram schematically illustrating one example of fully connecting.

FIG. 2D is a diagram schematically illustrating one example of fully connecting. The example illustrated in FIG. 2D is an example of a case where, when the number of targets to be identified is i, each of the j neuron data is fully connected to obtain i neuron data. For example, the fully-connected layer performs an operation for fully connecting of the following formula (4), and further performs an operation of the following formula (5) on the computed result.

$$x_i^l = \sum_j w_{ji}^{l-1} y_j^{l-1} \quad (4)$$

$$y_i^l = \sigma(x_i^l) + b_i^l \quad (5)$$

Herein, $y_j^{l-1}$ is an output from a unit $U^{l-1}$, and is a neuron datum to be input to a unit $U^l$. Moreover, $w_{ji}^{l-1}$ is a parameter that indicates a weight according to $y_j^{l-1}$ and $y_i^l$. Moreover, $x_i^l$ is a datum on which a weighting operation has been performed. Herein, $y_i^l$ is a neuron datum to be an output from a unit $U_i^l$ obtained by applying the non-linear activation function σ to $x_i^l$ and adding thereto a predetermined bias $b_i^l$.

For example, ReLU can be employed as the non-linear activation function σ.

The neuron data that is the computed result by the neural network is output to an identification layer so as to be identified in the identification layer. For example, neuron data that is a computed result by the convolution neural network illustrated in FIG. 1 is output to the identification layer, and the image is identified in the identification layer. For example, when identifying which of 10 kinds an identification target imaged on the image is, the fully-connected layer outputs 10 neuron data as a computed result. The identification layer employs a kind of an image according to the largest neuron data as an identified result. When the learning is performed, the recognized result is compared with a correct answer to obtain errors.

Meanwhile, the neuron data of the computed result by the neural network is a real number. The identification layer normalizes the neuron data of the computed result so that the result is easily identified. For example, the identification layer normalizes the neuron data of the computed result into a range from zero to one by using an activation function such as a Softmax function. The Softmax function is a universalized logistic function to normalize an n-dimensional vector x having arbitrary real numbers into an n-dimensional vector σ(x) having real numbers that are in (0, 1) interval and whose total is one. For example, the identification layer performs an operation of the Softmax function of the following formula (6).

$$\sigma(x_i) = \frac{\exp(x_i)}{\sum_{i=1}^{n} \exp(x_j)} \quad (6)$$

Thus, n neuron data $x_i$ that is the computed result of the neural network is converted into a probability distribution of a probability σ(x) in which the each of the n neuron data $x_i$ is a corresponding recognition target i. The identification layer employs, as the identified result, a kind of the image according to the neuron data whose probability distribution is the largest. When performing the learning, the identification layer compares a recognized result with a correct answer to obtain errors. For example, the identification layer obtains errors from a target probability distribution (correct answer) by using a cross-entropy error function. For example, the identification layer performs an operation for an error function of the following formula (7).

$$E = -\Sigma_{i=1}^n t_i \log(y_i) \quad (7)$$

Herein, $t_i$ is a target distribution, and $t_i$ is one when the recognition target i is a correct answer and otherwise $t_i$ is zero. Moreover, $y_i$ is a probability σ($x_i$), of the recognition target i, which is operated by the neural network.

The deep learning performs a supervised learning to cause the neural network to automatically learn a feature. For example, an error backward propagation method, which is commonly used in the supervised learning, causes the neural network to perform a forward propagation on data for learning so as to perform recognition, and compares the recognized result with a correct answer to obtain errors. The error backward propagation method causes the neural network to propagate the errors from the correct answer of the recognized result in the backward direction reverse to that in recognizing, and changes parameters of each hierarchy of the neural network so as to accord the recognized result with an optimum solution.

Next, one example of a computation of errors will be explained. For example, the error backward propagation method performs a partial-differentiation operation on the error function of the following formula (8).

$$\frac{\partial E}{\partial x_i^L} = y_i - t_i \quad (8)$$

The error backward propagation method computes an error gradient at an output layer L from the following formula (9). In the identification layer that performs the operation using the Softmax function, the result of the formula (8) is an error gradient of the formula (9).

$$\frac{\partial E}{\partial x_i^L} = \sigma'(x_i^L) \frac{\partial E}{\partial y_i^L} \quad (9)$$

The error backward propagation method computes an error gradient for an input by using partial differentiation from errors in an output layer L. For example, a layer, which performs an operation of an activation function such as ReLU, computes an error gradient for an input from the following formula (10-1). Moreover, σ'(x) is obtained from the following formula (10-2), and X is a value that is used at the recognition. When σ'(x) is assigned to the formula (10-1), an error gradient $$\frac{\partial E}{\partial x_i^l}$$

is to be obtained. When there exists no activation function, the operations of the formulae (10-1) and (10-2) are skipped.

$$\frac{\partial E}{\partial x_j^l} = \sigma'(x_j^l) \frac{\partial E}{\partial y_j^l} \quad (10\text{-}1)$$

$$\sigma'(x) = \begin{cases} 0 & (x \leq 0) \\ 1 & (\text{otherwise}) \end{cases} \quad (10\text{-}2)$$

The error backward propagation method computes an error gradient of a parameter with respect to a layer having a parameter (weight) in the operation. For example, a full-connection operation of the formula (4) computes an error gradient of a parameter from the following formula (11-1). The convolution operation of the formula (1) computes an error gradient of a parameter from the following formula (11-2). Herein, the value used at the recognition is used as $y_i^l$ that is to be obtained from a computation using the chain rule of partial differentiation.

$$\frac{\partial E}{\partial w_{ij}^l} = y_i^l \frac{\partial E}{\partial x_j^{l+1}} \quad (11\text{-}1)$$

$$\frac{\partial E}{\partial w_{ab}} = \sum_{i=0}^{N-m} \sum_{j=0}^{N-m} \frac{\partial E}{\partial x_{ij}^l} \frac{\partial x_{ij}^l}{\partial w_{ab}} = = \sum_{i=0}^{N-m} \sum_{j=0}^{N-m} \frac{\partial E}{\partial x_{ij}^l} y_{(i+a)(j+b)}^{l-1} \quad (11\text{-}2)$$

The error backward propagation method computes an error gradient for a previous layer (layer L−1). For example, when the previous layer is a layer that performs a full-connection operation, the error backward propagation method computes an error gradient for the previous layer from the following formula (12-1). When the previous layer is a layer that performs a convolution operation, the error backward propagation method computes an error gradient for the previous layer from the following formula (12-2). The value used at the recognition is used as $w_{ij}^l$ that is to be obtained from a computation using the chain rule of partial differentiation. When the previous layer is a layer that performs Max-Pooling, an error gradient $$\frac{\partial E}{\partial x_i^l}$$

is added to a place where a maximum value is taken from the k×k area at the recognition. Nothing is performed on places other than the k×k area.

$$\frac{\partial E}{\partial y_i^l} = \sum w_{ij}^l \frac{\partial E}{\partial x_j^{l+1}} \quad (12\text{-}1)$$

$$\frac{\partial E}{\partial y_{ij}^{l-1}} = \quad (12\text{-}2)$$

$$\sum_{a=0}^{m-1} \sum_{b=0}^{m-1} \frac{\partial E}{\partial x_{(i-a)(j-b)}^l} \frac{\partial x_{(i-a)(j-b)}^l}{\partial y_{ij}^{l-1}} = \sum_{a=0}^{m-1} \sum_{b=0}^{m-1} \frac{\partial E}{\partial x_{(i-a)(j-b)}^l} w_{ab}$$

The neural network performs a backward propagation, and repeatedly computes an error gradient of each layer up to the uppermost of the neural network so as to compute the errors. For example, the neural network computes an error gradient for an input from errors in the layer L by using the formula (10-1). For example, errors for an input of the formula (10-1) are obtained by assigning thereto an error gradient of the formula (9). When the lower layer is other than the identification layer, errors for an input of the formula (10-1) are obtained by assigning thereto error gradients computed by the formulae (12-1) and (12-2). For example, an error gradient of a parameter of the formula (11-1) is obtained by assigning thereto errors computed by the formula (10-1). For example, errors for the previous layer of the formula (12-1) are obtained by assigning thereto errors computed by the formula (10-1). In the computation of the error, parameters of all of the layers are updated in accordance with the errors.

Figure 3:
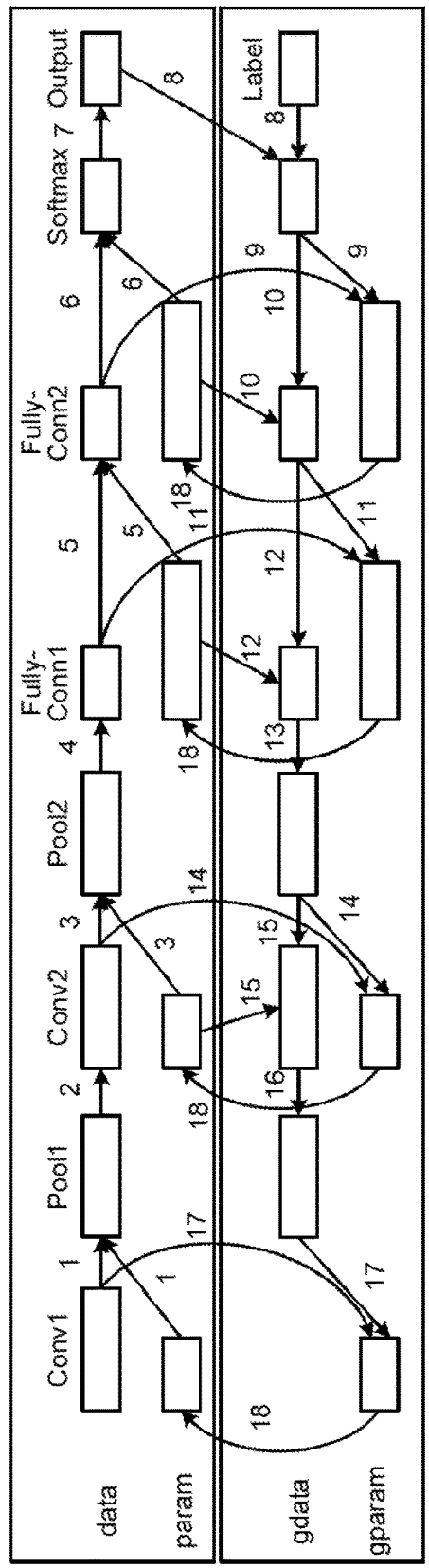
FIG. 3 is a diagram illustrating one example of a computation flow of a conventional neural network.

Herein, one example of a computation flow of a conventional neural network will be explained. FIG. 3 is a diagram illustrating one example of a computation flow of the conventional neural network. The example illustrated in FIG. 3 indicates each of the data and an order of processes when learning of a neural network is performed as the convolution neural network. The neural network illustrated in FIG. 3 has a hierarchical structure in which a first convolution layer (Conv1), a first pooling layer (Pool1), a second convolution layer (Conv2), a second pooling layer (Pool2), a first fully-connected layer (Fully-Conn1), a second fully-connected layer (Fully-Conn2), and an identification layer (Softmax) are aligned in this order. "Data" indicates a data size of neuron data of each of the layers. "Param" indicates a data size of a parameter of each of the layers. "Gdata" indicates a data size of an error gradient of the neuron data of each of the layers. "Gparam" indicates a data size of an error gradient of the parameter of each of the layers. The first pooling layer, the second pooling layer, and the identification layer use no parameter in their operations, and thus states thereof have no "param" and "gparam". Arrows indicate process flows when the learning of the neural network is performed. Numeric characters provided to the respective arrows indicate process orders.

When learning of the neural network is performed, first, an image to be learned is identified. For example, processes of respective layers are sequentially executed on the image to be learned in the order of numeric characters "1" to "7" so as to output (Output) a processed result. When the learning of the neural network is performed, next, learning based on the identified result is performed. For example, as indicated by a numeric character "8", the identified result is compared with a correct answer so as to obtain errors. Label indicates the correct answer of the image to be learned. A process is executed which computes errors from the correct answer of the recognized result and error gradients of the respective layers in the order of numeric characters "9" to "17". As indicated by a numeric character "18", a process is executed which changes parameters of each hierarchy. The parameter may be changed at timing when the error gradient is computed for each hierarchy.

Herein, an error gradient (gdata) of neuron data of each of the layers are computed from the error gradient (gdata) and a parameter (param) at the recognition of the previous layer. For example, the second fully-connected layer computes, as indicated by "10", an error gradient (gdata) of the neuron data from the error gradient (gdata) of the identification layer and a parameter (param) of the second fully-connected layer. An error gradient (gparam) of parameters of each of the layers is computed from an error gradient (gdata) of the corresponding previous layer and neuron data (data) at the recognition. For example, the second fully-connected layer computes, as indicated by "9", the error gradient (gparam) of the parameter from the error gradient (gdata) of the identification layer and the neuron data (data) of the second fully-connected layer. Thus, the conventional deep learning memorizes, in performing learning, the neuron data (data) and the parameter (param) when the input data for learning is recognized. Moreover, the conventional deep learning memorizes, in performing learning, the error gradient (gdata) of the neuron data and the error gradient (gparam) of the parameters. Thus, a used memory amount is increased in the learning.

When a deep learning performs learning on a large amount of images that are dealt with as input data for the learning, there exists a method for executing at once an iterative learning process on all of the input data. However, the number of data of the input data for learning is very large in some cases. For example, there exists a case where the number of data of input data for learning is tens of thousands to millions. When the iterative learning process is executed at once on the input data, a time period of the deep learning from a completion of the processes to a return is long. Moreover, in the deep learning, because computed results of respective layers of the neural network are held for each of the input data, a used memory amount becomes large. Therefore, there exists a mini-batch method that divides the input data into a predetermined number of data units so as to repeat a batch process for learning. The mini-batch method divides the input data into, for example, M data units so as to execute a probabilistic iterative batch process. In this case, for example, parameters are updated by using the following formula (13).

$$W_{t+1} = W_t + \frac{\eta}{|M|} \sum_{m=1}^{M} \frac{\partial E}{\partial w_t} \quad (13)$$

$W_t$ is a value of a parameter before updating. $W_{t+1}$ is a value of a parameter after updating. Moreover, $\eta$ is a learning rate that indicates a rate at which a computed error is reflected on the parameter before updating.

Figure 4:
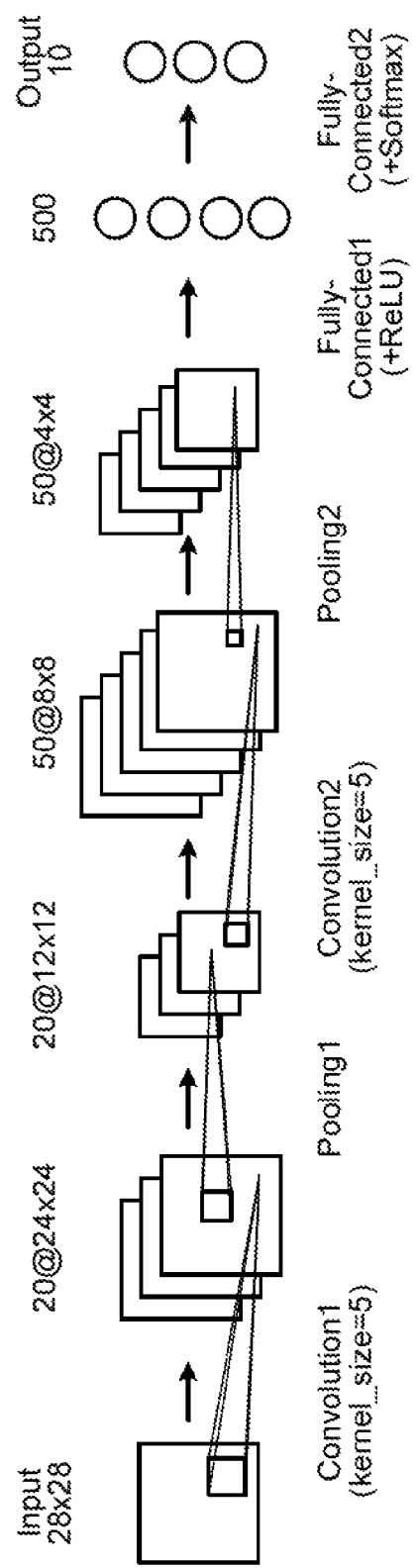
FIG. 4 is a diagram schematically illustrating one example of a process flow of LeNet.

Herein, one example of a conventional used memory amount will be explained. For example, a used memory amount using a neural network having a configuration of LeNet by LeCun et al. will be explained. FIG. 4 is a diagram schematically illustrating one example of a process flow of the LeNet. In the example illustrated in FIG. 4, a 28×28-pixel image is input (Input) as neuron data. The neural network performs, as a first convolution layer (Convolution1), convolution operations on the 28×28-pixel neuron data by using respective 20 filters having a 5×5 size so as to compute "20" 24×24-pixel neuron data. Next, the neural network performs, as a first pooling layer (Pooling1), Max-Pooling, which takes a maximum value from each 2×2 area, on the "20" 24×24-pixel neuron data so as to obtain "20" 12×12-pixel neuron data. Next, the neural network performs, as a second convolution layer (Convolution2), convolution operations on the "20" 12×12-pixel neuron data by using respective 50 filters having a 5×5 size so as to obtain "50" 8×8-pixel neuron data. Next, the neural network performs, as a second pooling layer (Pooling2), Max-Pooling that takes a maximum value from each 2×2 area on "50" 8×8-pixel neuron data so as to obtain "50" 4×4-pixel neuron data. Next, the neural network fully connects, as a first fully-connected layer (Fully-Connected1), "50" 4×4-pixel neuron data with each of the 500 units, and performs an ReLU operation on the corresponding unit so as to obtain "500" neuron data. Next, the neural network fully connects, as a second fully-connected layer (Fully-Connected2), the "500" neuron data with each of the 10 units, and performs a Softmax-function operation so as to obtain 10 neuron data.

FIG. 5 is a diagram illustrating one example of a conventional used memory amount. The example illustrated in FIG. 5 indicates a used memory amount when input data is divided into 64 data units (batch size M=64) and the process of the neural network illustrated in FIG. 4 is executed thereon.

For example, when an image is recognized, 50,176-byte memory is used for memorizing neuron data as an input. In the first convolution layer (Convolution1), 737,280-byte memory is used for memorizing the neuron data and 500-byte memory is used for memorizing the parameters. In the first pooling layer (Pooling1), 184,320-byte memory is used for memorizing the neuron data. In the second convolution layer (Convolution2), 204,800-byte memory is used for memorizing the neuron data and 25,000-byte memory is used for memorizing the parameters. In the second pooling layer (Pooling2), 51,200-byte memory is used for memorizing the neuron data. In the first fully-connected layer (Fully-Connected1), 32,000-byte memory is used for memorizing the neuron data, and 400,000-byte memory is used for memorizing the parameters. In the second fully-connected layer (Fully-Connected2), 640-byte memory is used for memorizing the neuron data, and 5,000-byte memory is used for memorizing the parameters. In the Softmax-function process, 640-byte memory is used for memorizing the neuron data. Therefore, when the batch size M is 64 in the recognition of the image, each of the values is multiplied by 64 (multiplied by 4 bytes), so that 5.04 M-byte memory is used in total for memorizing the neuron data and 1.72 M-byte memory is used in total for memorizing the parameters.

Moreover, in learning, a memory having a size similar to that at the recognition of the image is used. In other words, in the learning, 5.04 M-byte memory is further used in total for memorizing the neuron data and 1.72 M-byte memory is further used in total for memorizing the parameters.

In a first embodiment, a recognition apparatus, which performs a deep learning while reducing a used memory amount in learning, will be explained.

Configuration of Recognition Apparatus

Figure 6:
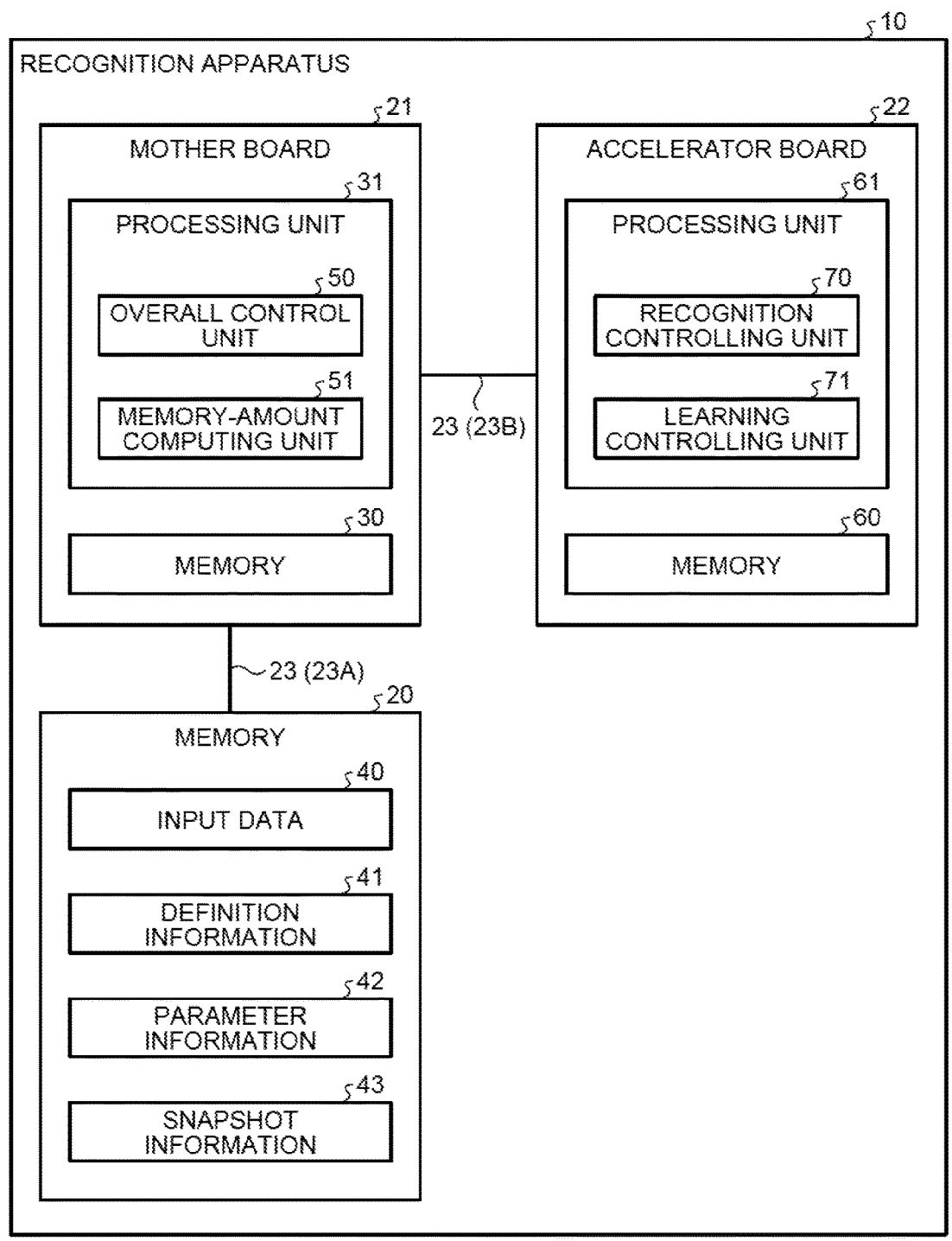
FIG. 6 is a diagram schematically illustrating a functional configuration of a recognition apparatus.

A configuration of a recognition apparatus 10 according to the first embodiment will be explained. FIG. 6 is a diagram schematically illustrating a functional configuration of the recognition apparatus. The recognition apparatus 10 is an apparatus that recognizes various kinds of targets by using a deep learning. For example, the recognition apparatus 10 is a computer such as a server computer. The recognition apparatus 10 may be implemented as one computer, or may be implemented as a plurality of computers. In the present embodiment, a case in which the recognition apparatus 10 is implemented as one computer will be explained as an example. In the present embodiment, a case in which the recognition apparatus 10 recognizes an image will be explained as an example.

As illustrated in FIG. 6, the recognition apparatus 10 includes a memory 20, a mother board 21, and an accelerator board 22. The recognition apparatus 10 may include another device other than the aforementioned devices. For example, the recognition apparatus 10 may further include an input unit that receives various kinds of operations, a display that displays various kinds of information, etc.

The memory 20 is a memory device such as a hard disk drive and a Solid State Drive (SSD). The mother board 21 is a board on which parts having main functions of the recognition apparatus 10 are mounted. The accelerator board 22 is a board on which hardware additionally used is mounted so as to improve a processing ability of the recognition apparatus 10. A plurality of the accelerator boards 22 may be provided. In the present embodiment, a case in which the one accelerator board 22 is provided will be explained as an example.

The memory 20, the mother board 21, and the accelerator board 22 are connected with each other by a bus 23 that can transmit data. For example, the memory 20 and the mother board 21 are connected with each other by a bus 23A such as a Serial Advanced Technology Attachment (SATA) and a Serial Attached Small computer system interface (SAS). The mother board 21 and the accelerator board 22 are connected with each other by a bus 23B such as a Peripheral Component Interconnect Express (PCI Express).

The deep learning performs operations in large amounts. Therefore, the recognition apparatus 10 performs operation by using the accelerator board 22 using an accelerator such as a Graphics Processing Unit (GPU) and a dedicated chip, so as to speed up a process.

The memory 20 memorizes an Operating System (OS) and various programs that execute various kind processes to be mentioned later. Moreover, the memory 20 memorizes various kinds of information. For example, the memory 20 memorizes input data 40, definition information 41, parameter information 42, and snapshot information 43. The memory 20 may memorize other various kinds of information.

The input data 40 is data that is an input target to the neural network. For example, when a supervised learning is performed, the input data 40 is data for learning. For example, when the neural network learns features of identification targets imaged on images, the input data 40 is data that associates a large amount of images on which various identification targets are imaged with labels that indicate correct answers indicating what the identification targets are. When the neural network performs identification, the input data 40 is data that is an identification target. For example, when an identification target imaged on an image is to be identified, the input data 40 is data on the image that is the identification target.

The definition information 41 includes data that memorizes information on the neural network. For example, the definition information 41 memorizes information that indicates a configuration of the neural network, such as a hierarchical structure of the neural network, a configuration of units in each hierarchy, and a connection relation between the units. When an image is recognized, the definition information 41 memorizes information that indicates, for example, a configuration, which is decided by a designer and the like, of a convolution neural network.

The parameter information 42 includes data that memorizes a parameter value of a weight value and the like, which is used in an operation of each layer of the neural network. The parameter values memorized in the parameter information 42 are predetermined initial values in an initial state, and are updated in accordance with learning.

The snapshot information 43 is data that memorizes, when input data is divided into predetermined number of data units and a batch process for learning is repeated, information on halfway process states.

The mother board 21 includes a memory 30 and a processing unit 31.

The memory 30 is a semiconductor memory such as a Random Access Memory (RAM). The memory 30 memorizes information on processes to be executed by the processing unit 31 and various kinds of information to be used in the process.

The processing unit 31 is a device that controls whole of the recognition apparatus 10. An electronic circuit such as a Central Processing Unit (CPU) and a Micro Processing Unit (MPU) may be employed as the processing unit 31. The processing unit 31 functions as various kinds of process units by operations of various kinds of programs. For example, the processing unit 31 includes an overall control unit 50 and a memory-amount computing unit 51.

The overall control unit 50 controls all of the processes associated with a deep learning. When receiving an instruction for starting a process of a deep learning, the overall control unit 50 reads, from the memory 20, various kinds of programs and information associated with the deep learning. For example, the overall control unit 50 reads various kinds of programs that control processes of the deep learning. Moreover, the overall control unit 50 reads the definition information 41 and the parameter information 42. The overall control unit 50 specifies a structure of the neural network on the basis of the definition information 41 and the parameter information 42 so as to decide a process order of recognizing and learning processes of the neural network. The overall control unit 50 may decide the process order of the learning process at timing when the learning process is started.

The overall control unit 50 reads the input data 40 from the memory 20 while dividing the input data 40 into predetermined number of data units. The overall control unit 50 offloads information on the read input data 40 and the recognizing and learning processes on the accelerator board 22. The overall control unit 50 controls the accelerator board 22 to cause the accelerator board 22 to execute the recognizing and learning processes of the neural network. The overall control unit 50 controls the process order of the learning process on the basis of a memory amount computed by the memory-amount computing unit 51.

The memory-amount computing unit 51 computes a used memory amount used in memorizing data by the deep learning. For example, the memory-amount computing unit 51 computes a used memory amount to be used in memorizing neuron data and a parameter in each layer of the neural network on the basis of the definition information 41.

The accelerator board 22 includes a memory 60 and a processing unit 61.

The memory 60 is a semiconductor memory such as a RAM. The memory 60 memorizes information on processes to be executed by the processing unit 61 and various kinds of information to be used in the processes.

The processing unit 61 is a device that controls the accelerator board 22. An electronic circuit, such as a Graphics Processing Unit (GPU), an Application Specific Integrated Circuit (ASIC), and a Field-Programmable Gate Array (FPGA), may be employed as the processing unit 61. Various kinds of programs operate in accordance with the control by the overall control unit 50, the processing unit 61 functions as various kinds of process units. For example, the processing unit 61 includes a recognition controlling unit 70 and a learning controlling unit 71.

The recognition controlling unit 70 controls a recognizing process of the neural network. For example, the recognition controlling unit 70 executes the recognizing process in accordance with the process order by using the input data offloaded from the mother board 21 as the neuron data. For example, the recognition controlling unit 70 performs an operation of each layer of the neural network in response to the neuron data, and holds the neuron data and the parameter of the corresponding layer of the neural network in the memory 60.

The learning controlling unit 71 controls a learning process of the neural network. For example, the learning controlling unit 71 obtains errors from a correct answer of an identified result obtained from the recognizing process, and executes the learning process for propagating the errors into the neural network in accordance with the process order. For example, the learning controlling unit 71 computes an error gradient of each layer of the neural network from the errors so as to learn the parameter. In this case, the learning controlling unit 71 computes an error gradient of one of the neuron data and the parameter, which has a smaller used memory amount, with respect to a layer whose neuron data and parameter are held in the memory area, and holds the computed error gradient in the memory 60. Subsequently, the learning controlling unit 71 controls to compute an error gradient of the other having a larger used memory amount and overwrite a memory area in data on the recognizing process held in the memory 60 with the computed error gradient.

Figure 7:
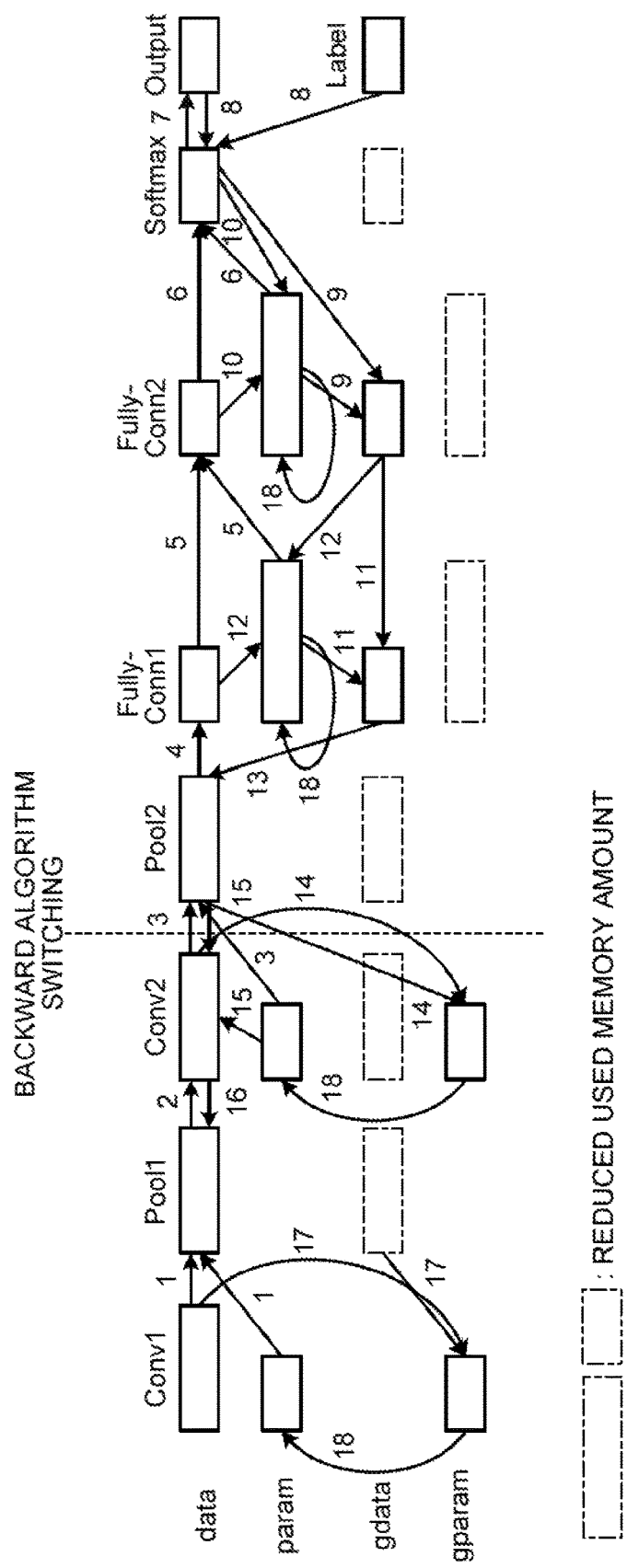
FIG. 7 is a diagram illustrating one example of a computation flow of a neural network according to a present embodiment.

Herein, one example of a computation flow of the neural network according to the present embodiment will be explained. FIG. 7 is a diagram illustrating one example of the computation flow of the neural network according to the present embodiment. There is illustrated in FIG. 7 a computation flow in a case where the recognition apparatus 10 according to the present embodiment executes a neural network process similar to that illustrated in FIG. 3. The neural network has, similarly to FIG. 3, a hierarchical structure in which the first convolution layer (Conv1), the first pooling layer (Pool1), the second convolution layer (Conv2), the second pooling layer (Pool2), the first fully-connected layer (Fully-Conn1), the second fully-connected layer (Fully-Conn2), and the identification layer (Softmax) are aligned in this order. The "data" indicates a data size of neuron data of each layer. The "param" indicates a data size of a parameter of each layer. The "gdata" indicates a data size of an error gradient of the neuron data of each layer. The "gparam" indicates a data size of an error gradient of the parameter of each layer. The first pooling layer, the second pooling layer, and the identification layer use no parameter in their operations, and thus states thereof have no "param" and "gparam". Arrows indicate process flows when the learning of the neural network is performed. Numeric characters provided to the respective arrows indicate process orders.

When performing the learning of the neural network, the recognition controlling unit 70 executes a recognizing process for identifying an image to be learned. For example, the recognition controlling unit 70 sequentially executes, similarly to the conventional neural network computation illustrated in FIG. 3, processes of respective layers in the order of numeric characters "1" to "7" so as to output (Output) a processed result. For example, the recognition controlling unit 70 executes, in the first convolution layer (Conv1) and the second convolution layer (Conv2), processes for holding, in the memory 60, computed convolution amounts on the basis of the respective neuron data and parameter. In the first pooling layer (Pool1) and the second pooling layer (Pool2), the recognition controlling unit 70 executes processes for holding, in a memory area of the memory 60, thinned convolution amounts obtained by executing respective thinning processes on the convolution amounts, held in the memory 60, of the previous layer. In the first fully-connected layer (Fully-Conn1) and the second fully-connected layer (Fully-Conn2), the recognition controlling unit 70 executes processes for holding, in the memory 60, output results obtained by multiplying weights of the layers held in the memory 60 by all of the convolution amounts, held in the memory 60, of the previous layer, respectively. The recognition controlling unit 70 executes, in the identification layer (Softmax), a process for normalizing the output result, held in the memory 60, of the previous layer so as to hold the normalized output result in the memory 60.

When performing the learning of the neural network, next, the learning controlling unit 71 executes a learning process for updating a parameter from errors of the identified result of the recognizing process. Similarly to the computation of the conventional neural network illustrated in FIG. 3, for example, the recognition controlling unit 70 compares, as indicated by a numeric character "8", the identified result with a correct answer so as to obtain errors. The recognition controlling unit 70 sequentially computes error gradients of the respective layers in the order of numeric characters "9" to "17". The recognition controlling unit 70 changes, as indicated by a numeric character "18", the parameter of each of the hierarchies. The change in the parameters of hierarchies may be performed at timing after the error gradient is computed for each layer.

For example, the learning controlling unit 71 overwrites a memory area that holds the output result of the identification layer (Softmax) of the memory 60 with the error gradient of the output result computed on the basis of the output result from the identification layer (Softmax) held in the memory 60 so as to hold the error gradient. Thus, a memory area that memorizes the error gradient of the identification layer (Softmax) can be reduced compared with the conventional technology.

The learning controlling unit 71 computes, with respect to a layer whose memory area holds neuron data and parameters, an error gradient of one of the neuron data and the parameters, which has a smaller used memory amount, and holds the computed error gradient in the memory 60. Subsequently, the learning controlling unit 71 controls to compute an error gradient of the other having a larger used memory amount and overwrite a memory area in data of the recognizing process held in the memory 60 with the computed error gradient. In the example illustrated in FIG. 7, the neuron data and the parameters of the first convolution layer (Conv1), the second convolution layer (Conv2), the first fully-connected layer (Fully-Conn1), and the second fully-connected layer (Fully-Conn2) are held in the memory areas. When a neuron data size is a parameter size or less, the learning controlling unit 71 holds, in the memory 60, an error gradient to be sent to the next layer, which is computed on the basis of the error gradient of the previous layer held in the memory 60. Subsequently, the learning controlling unit 71 saves each error gradient of the parameter to be sent to the next layer in a corresponding memory area of the memory 60 that holds the parameters of the recognizing process. For example, in the example illustrated in FIG. 7, neuron data sizes of the first fully-connected layer (Fully-Conn1) and the second fully-connected layer (Fully-Conn2) in the recognizing process are equal to or less than the parameter size. Thus, the learning controlling unit 71 saves, as indicated by numeric characters "9" and "11", the error gradients of the neuron data in the memory 60. As indicated by numeric characters "10" and "12", the learning controlling unit 71 computes error gradients of the parameters, and overwrites therewith the memory area that holds the parameters of the recognizing process so as to save the error gradients. Thus, compared with the computation of the conventional neural network illustrated in FIG. 3, memory areas that memorize the error gradients of the parameters of the first fully-connected layer (Fully-Conn1) and the second fully-connected layer (Fully-Conn2) are reduced. When the neuron data size is larger than the parameter size, the learning controlling unit 71 holds, in the memory 60, the error gradient of the parameter to be sent to the next layer, which is computed based on the error gradient held in the memory 60. Subsequently, the learning controlling unit 71 saves the error gradient to be sent to the next layer in the corresponding memory area in the memory 60 that holds the neuron data of the recognizing process. For example, in the example illustrated in FIG. 7, the neuron data size of the second convolution layer (Conv2) is larger than the parameter size thereof in the recognizing process. Thus, as indicated by a numeric character "14", the learning controlling unit 71 saves the error gradient of the parameter in the memory 60. As indicated by a numeric character "15", the learning controlling unit 71 computes an error gradient of the neuron data, and overwrites therewith the memory area that holds the neuron data of the recognizing process so as to save the error gradient. Thus, compared with the computation of the conventional neural network illustrated in FIG. 3, the memory area that memorizes the error gradient of the neuron data of the second convolution layer (Conv2) is reduced.

The learning controlling unit 71 computes an error gradient of neuron data with respect to a layer whose neuron data is held in the memory area. The learning controlling unit 71 controls to overwrite the memory area of the neuron data of the recognizing process, which is held in the memory 60, with the error gradient of the computed neuron data. In the example illustrated in FIG. 7, the memory areas of the first pooling layer (Pool1) and the second pooling layer (Pool2) hold therein neuron data. The learning controlling unit 71 computes error gradients of the neuron data with respect to the first pooling layer (Pool1) and the second pooling layer (Pool2). As indicated by numeric characters "13" and "16", the learning controlling unit 71 overwrites the memory area of the neuron data of the recognizing process, which is held in the memory 60, with the error gradient of the neuron data. Thus, compared with the computation of the conventional neural network illustrated in FIG. 3, the memory areas that memorize the error gradients of the neuron data of the first pooling layer (Pool1) and the second pooling layer (Pool2) are reduced.

Herein, one example of a memory amount used by the recognition apparatus 10 according to the present embodiment will be explained. FIG. 8 is a diagram illustrating one example of a memory amount used by the recognition apparatus according to the present embodiment. The example illustrated in FIG. 8 indicates a used memory amount when input data is divided into 64 data units (batch size M=64) and the processes of the neural network illustrated in FIG. 7 are executed thereon.

A memory having a size similar to that of the example illustrated in FIG. 5 is used at recognition of an image.

On the other hand, in the learning, a memory area additionally used in memorizing an error gradient of neuron data is reduced to zero in the first convolution layer (Convolution1), compared with the example illustrated in FIG. 5. A memory area additionally used in memorizing an error gradient of neuron data is reduced to zero also in the second convolution layer (Convolution2). These first and second convolution layers are grouped into a group A in an image recognizing process to be mentioned later. In the first fully-connected layer (Fully-Connected1), a memory area additionally used in memorizing an error gradient of a parameter is reduced to zero. In the second fully-connected layer (Fully-Connected2), a memory area additionally used in memorizing an error gradient of a parameter is also reduced to zero. These first and second fully-connected layers are grouped into a group B in the image recognizing process to be mentioned later. In a process of the Softmax function, a memory area additionally used in memorizing an error gradient of neuron data is reduced to zero. A memory area additionally used in memorizing the error gradient of the neuron data is reduced to zero also in the first pooling layer (Pool1) and the second pooling layer (Pool2). The process of the Softmax function, the first pooling layer (Pool1), and the second pooling layer (Pool2) are grouped into a group C in the image recognizing process to be mentioned later. When the batch size M is 64 in recognition of the learning, each of the layers is multiplied by 64 (multiplied by 4 bytes), so that a used memory amount of the neuron data is reduced in total into 13.04 K bytes and a used memory amount of the parameter is reduced in total into 1.02 M bytes.

A memory capacity of the memory 60 to be mounted on the accelerator board 22 is commonly small. As an example of the accelerator board 22, a memory capacity of a memory mounted on "Nvidia GeForce GTX TITAN X" is 12 GB.

A used memory amount of a deep learning is large caused by a multi-hierarchization of a neural network, and the used memory amount further increases in the learning. In the deep learning, when an accelerator board executes a computing process on the neural network, the process is limited in some cases by a memory capacity of a local memory of the accelerator board. For example, in the deep learning, as a used memory amount used by one process is larger, because the number of processes that can be processed at one batch by the accelerator board is more reduced, a time period for learning input data is increased more.

Figure 9:
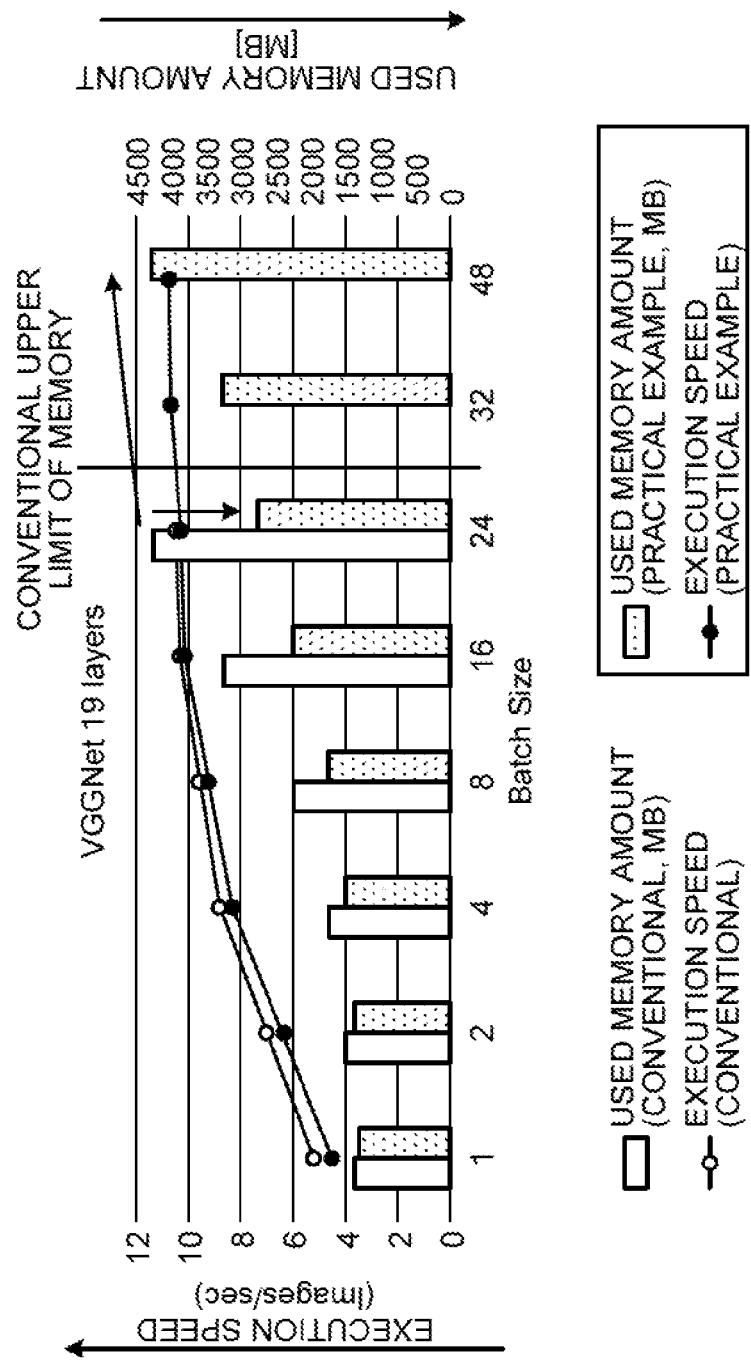
FIG. 9 is a diagram illustrating one example of effects.

FIG. 9 is a diagram illustrating one example of effects. In FIG. 9, results are illustrated, obtained by evaluating used memory amounts and execution speeds as actual measured values while changing the batch size M by targeting VGG-Net that is a neural network used in ImageNet Large Scale Visual Recognition Challenge 2014 (ILSVRC2014) of an image recognizing competition. In FIG. 9, changes in used memory amounts and execution speeds when original VGG-Net was performed as it is and when reduction, which has been explained in the present embodiment, in a used memory amount during the learning was applied are illustrated. When reduction, which has been explained in the present embodiment, in a used memory amount during the learning was applied, the used memory amount during the learning was largely reduced to 5 to 35%. When the reduction, which has been explained in the present embodiment, in a used memory amount during the learning was applied, a processing time period associated with increase in the batch size M declined so that the learning speed improved. When original VGGNet was performed as it is, an upper limit of the executable batch size M was 24. When the reduction, which has been explained in the present embodiment, in a used memory amount during the learning was applied, an upper limit of the executable batch size M was 48. In other words, when the reduction, which has been explained in the present embodiment, in a used memory amount during the learning was applied, the executable batch size increased twofold.

Processing Procedure

Figure 10A:
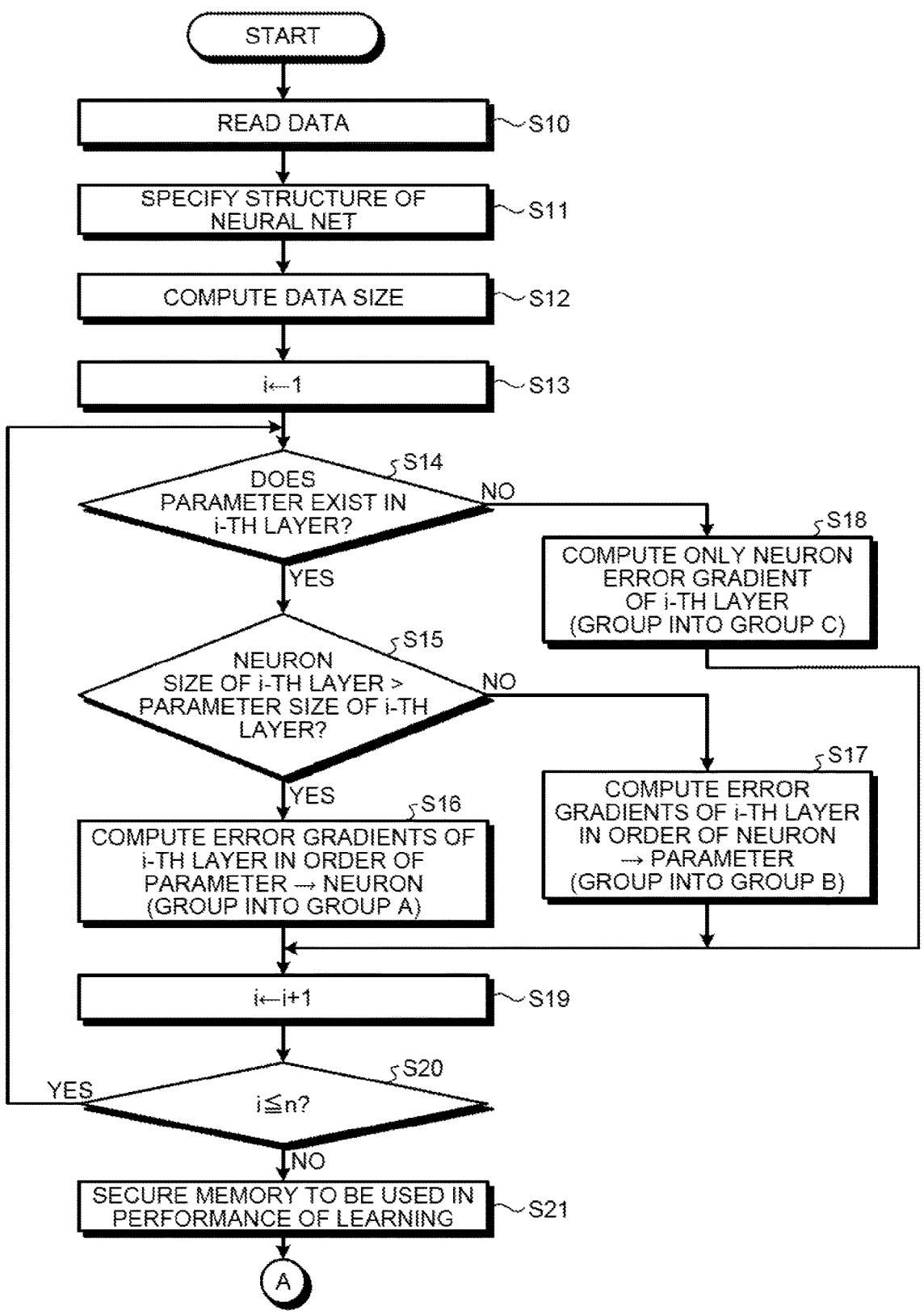
FIGS. 10A and 10B are flowcharts illustrating one example of a processing procedure for image recognizing.
Figure 10B:
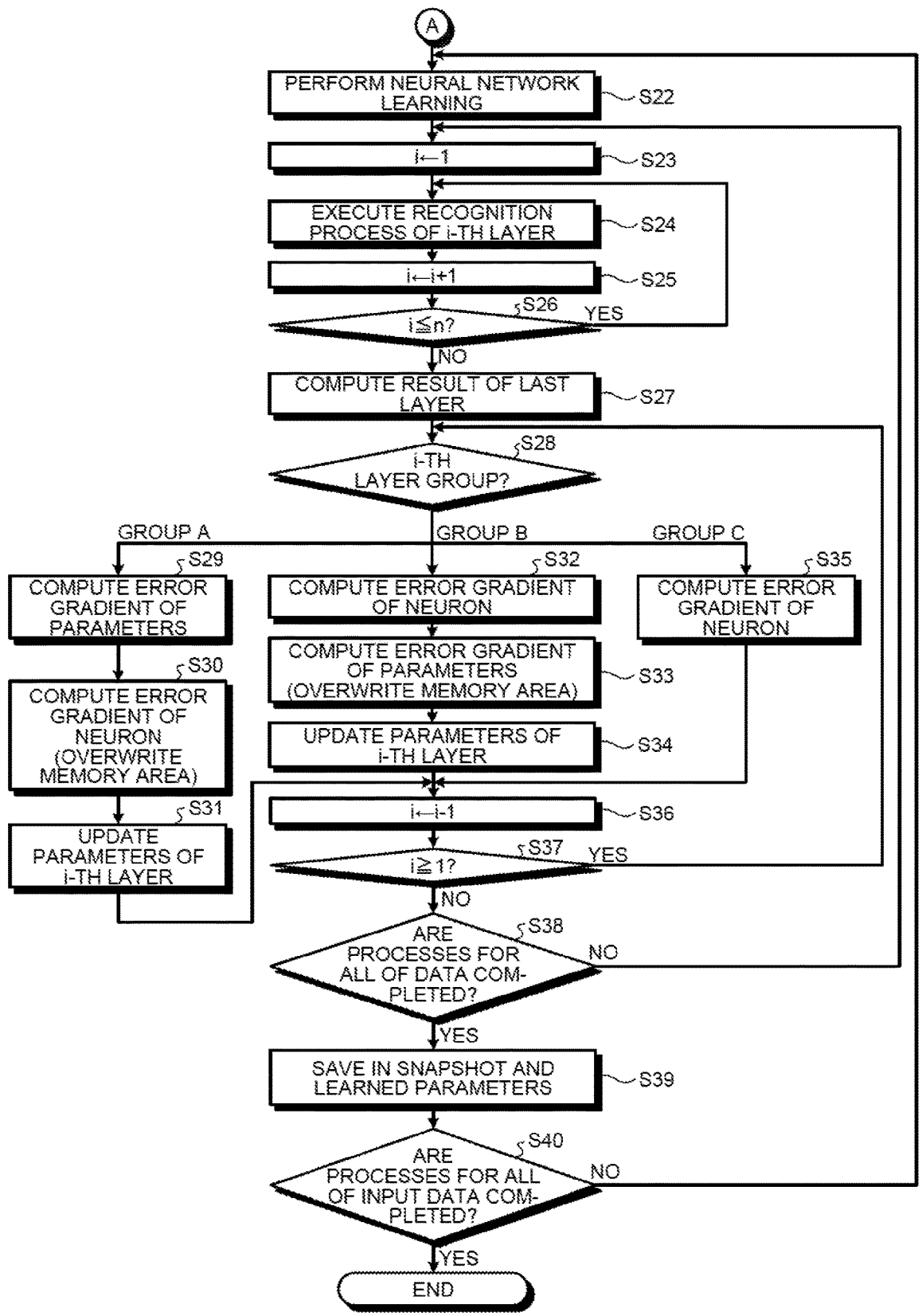

Next, a processing procedure for image recognizing to be executed by the recognition apparatus 10 according to the present embodiment will be explained. FIGS. 10A and 10B are flowcharts illustrating one example of the processing procedure for image recognizing. This image recognizing process is executed at a predetermined timing when, for example, an administrator instructs a start of the process.

As illustrated in FIG. 10A, the overall control unit 50 reads the definition information 41 and the parameter information 42 (Step S10). The overall control unit 50 specifies a structure of a neural network on the basis of the definition information 41 and the parameter information 42 (Step S11). The memory-amount computing unit 51 computes a used memory amount used in memorizing neuron data and a parameter on the basis of the definition information 41 for each layer of the neural network (Step S12). The overall control unit 50 initializes a parameter i into one (Step S13).

The overall control unit 50 groups i-th layers of the neural network into one of the groups A to C divided according to a computation order. The overall control unit 50 determines whether or not a parameter exists in the i-th layer of the neural network (Step S14). When a parameter exists in the i-th layer of the neural network (Step S14: Yes), the overall control unit 50 determines whether or not a data size of the neuron data is larger than that of the parameter (Step S15). When the data size of the neuron data is larger than that of the parameter (Step S15: Yes), the overall control unit 50 decides the computation order so that, in learning the i-th layer, an error gradient of the neuron data is computed after computation of an error gradient of the parameter (Step S16). A layer of this computation order is assumed to be the group A.

On the other hand, when the data size of the neuron data is equal to or less than the data size of the parameter (Step S15: No), the overall control unit 50 decides the computation order so that, in learning the i-th layer, an error gradient of the parameter is computed after computation of an error gradient of the neuron data (Step S17). A layer of this computation order is assumed to be the group B.

On the other hand, when there exists no parameter in the i-th layer of the neural network (Step S14: No), the overall control unit 50 decides the computation order so that, in learning the i-th layer, an error gradient of the neuron data is computed (Step S18). A layer of this computation order is assumed to be the group C.

The overall control unit 50 adds one to a value of the parameter i (Step S19). The overall control unit 50 determines whether or not the value of the parameter i is equal to or less than the number of layers ("n") of the neural network (Step S20). When the value of the parameter i is equal to or less than the number of layers ("n") of the neural network (Step S20: Yes), the process is shifted to the aforementioned Step S14.

On the other hand, when the value of the parameter i is not equal to or less than the number of layers ("n") of the neural network (Step S20: No), the overall control unit 50 controls the accelerator board 22 so as to secure, in the memory 60, a memory area having a data size to be used for the learning of the neural network (Step S21).

As illustrated in FIG. 10B, the overall control unit 50 reads the input data 40 from the memory 20 while dividing the input data 40 into a predetermined number of data units. The overall control unit 50 offloads, on the accelerator board 22, information on the read data, the recognizing process, and the learning process so as to start the learning of the neural network (Step S22).

The recognition controlling unit 70 initializes the parameter i into one (Step S23). The recognition controlling unit 70 reads data corresponding to one not processed process from the data offloaded from the mother board 21. The recognition controlling unit 70 performs, by using the read data as neuron data, an operation of the i-th layer on the neuron data in accordance with the order of the neural network, and holds a computed result in the memory 60 (Step S24). The recognition controlling unit 70 adds one to a value of the parameter i (Step S25).

The recognition controlling unit 70 determines whether or not the value of the parameter i is equal to or less than the number of layers ("n") of the neural network (Step S26). When the value of the parameter i is equal to or less than the number of layers ("n") of the neural network (Step S26: Yes), the process is shifted to the aforementioned Step S24.

On the other hand, when the value the parameter i is not equal to or less than the number of layers ("n") of the neural network (Step S26: No), the learning controlling unit 71 computes an error from a correct answer of an identified result of the last layer of the neural network (Step S27).

The learning controlling unit 71 determines to which of the groups A to C the i-th layer of the neural network belongs (Step S28).

When the i-th layer of the neural network is the group A, the learning controlling unit 71 computes an error gradient of the parameter and holds the error gradient in the memory 60 (Step S29). The learning controlling unit 71 computes an error gradient of the neuron data, and overwrites therewith a memory area of the memory 60 that memorizes the neuron data of the i-th layer of the neural network so as to save the error gradient (Step S30). The learning controlling unit 71 updates the parameter of the i-th layer of the neural network on the basis of the error gradient of the parameter of the i-th layer of the neural network (Step S31).

On the other hand, when the i-th layer of the neural network is the group B, the learning controlling unit 71 computes an error gradient of the neuron data so as to hold the error gradient in the memory 60 (Step S32). The learning controlling unit 71 computes an error gradient of the parameter, and overwrites therewith a memory area of the memory 60 that memorizes the parameter of the i-th layer of the neural network so as to save the error gradient (Step S33). The learning controlling unit 71 updates the parameter of the i-th layer of the neural network on the basis of the error gradient of the parameter of the i-th layer of the neural network (Step S34).

On the other hand, when the i-th layer of the neural network is the group C, the learning controlling unit 71 computes an error gradient of the neuron data so as to hold the error gradient in the memory 60 (Step S35).

The learning controlling unit 71 subtracts one from a value of the parameter i (Step S36). The recognition controlling unit 70 determines whether or not the value of the parameter i is one or more (Step S37). When the value of the parameter i is one or more (Step S37: Yes), the process is shifted to the aforementioned Step S28.

On the other hand, when the value of the parameter i is not one or more (Step S37: No), the learning controlling unit 71 determines whether or not processes for all of the offloaded data have completed (Step S38). When the processes for all of the offloaded data have not completed (Step S38: No), the process is shifted to the aforementioned Step S23.

On the other hand, when the processes for all of the offloaded data have completed (Step S38: Yes), the overall control unit 50 saves the processed result in the snapshot information 43 and the parameter information 42 (Step S39).

The overall control unit 50 determines whether or not learning of all of the input data 40 has completed (Step S40). When processes for all of the input data 40 have not completed (Step S40: No), the process is shifted to the aforementioned Step S22.

On the other hand, when processes for all of the input data 40 have completed (Step S40: Yes), the process is terminated.

Effects

As described above, the recognition apparatus 10 according to the present embodiment computes, in a learning process, an error gradient of one of neuron data and a parameter, which has a smaller used memory amount, with respect to a layer whose memory area holds the neuron data and the parameter, and holds the error gradient in the memory area. This recognition apparatus 10 computes an error gradient having a larger used memory amount, and overwrites therewith a memory area that holds data on a recognizing process. Thus, the recognition apparatus 10 can reduce a used memory amount in the learning.

The recognition apparatus 10 according to the present embodiment overwrites a memory area that holds a normalized output result with an error gradient of an output result computed from the normalized output result of the learning process and holds the error gradient. Thus, the recognition apparatus 10 can further reduce the used memory amount in the learning.

The recognition apparatus 10 according to the present embodiment overwrites, with respect to a layer on which a thinning process is executed in the learning process, a memory area that holds a thinned convolution amount in the learning process with an error gradient to be sent to the next layer so as to hold the error gradient. Thus, the recognition apparatus 10 can further reduce the used memory amount in the learning.

[b] Second Embodiment

So far, the disclosed apparatus according to the embodiment has been explained, the disclosed technology may be embodied in various kinds of mode other than the aforementioned embodiment. Thus, hereinafter, another embodiment included in the present disclosure will be explained.

For example, another method such as a momentum method may be employed for the learning. For example, the momentum method updates a value $W_{t+1}$ of a parameter with a linear sum between an error gradient $\nabla E(W)$ and a parameter $v_t$ of the previous cycle. For example, the updated parameters $v_{t+1}$ and $W_{t+1}$ at a t+1 cycle are computed from the following formulae (14-1) and (14-2) by using parameters $v_t$ and $W_t$ of the previous cycle.

$$V_{t+1} = \mu V_t - \alpha \nabla E(W_t) \quad (14\text{-}1)$$

$$W_{t+1} = W_t + V_{t+1} \quad (14\text{-}2)$$

Herein, $\alpha$ is a learning rate that is a multiplying factor for weighting the error gradient. Moreover, $\mu$ is a momentum that is a multiplying factor for weighting a parameter having updated at the previous cycle.

Figure 11:
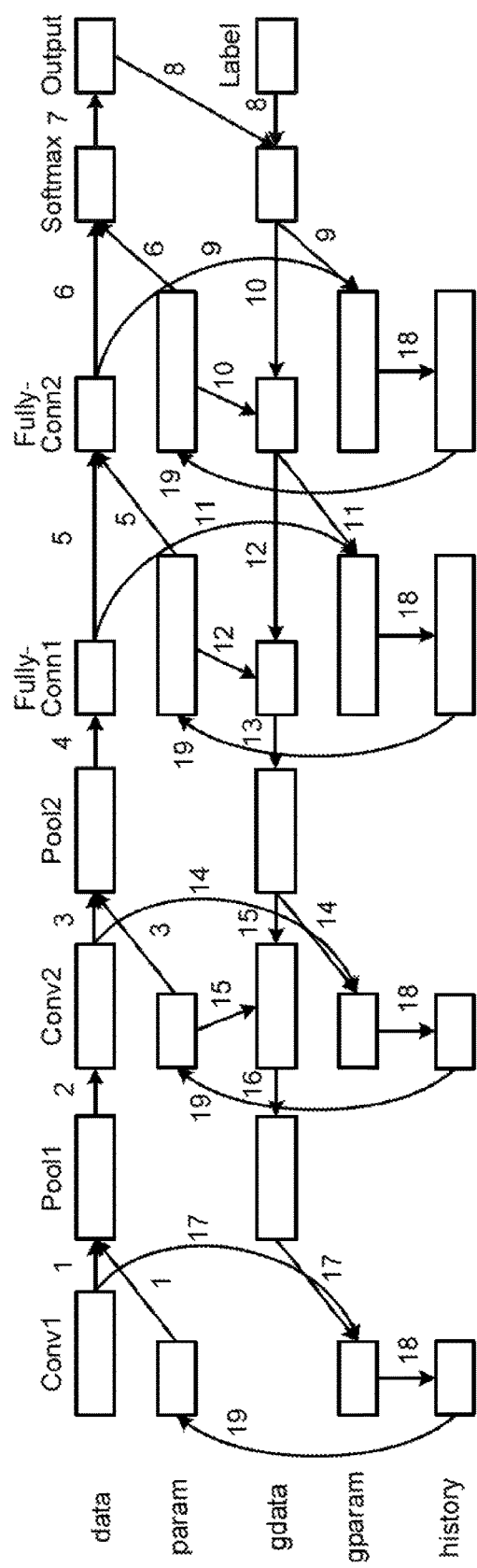
FIG. 11 is a diagram illustrating one example of a computation flow, using a momentum method, of a conventional neural network.

Herein, one example of a computation flow, using the momentum method, of a conventional neural network will be explained. FIG. 11 is a diagram illustrating one example of the computation flow, using the momentum method, of the conventional neural network. The neural network has a hierarchical structure in which the first convolution layer (Conv1), the first pooling layer (Pool1), the second convolution layer (Conv2), the second pooling layer (Pool2), the first fully-connected layer (Fully-Conn1), the second fully-connected layer (Fully-Conn2), and the identification layer (Softmax) are aligned in this order. "Data" indicates a data size of neuron data of each of the layers. "Param" indicates a data size of a parameter of each of the layers. "Gdata" indicates a data size of an error gradient of the neuron data of each of the layers. "Gparam" indicates a data size of an error gradient of the parameter of each of the layers. "History" indicates a data size of error information of the previous cycle. The first pooling layer, the second pooling layer, and the identification layer use no parameter in their operations, and thus states thereof have no "param" and "gparam". Arrows indicate process flows when the learning of the neural network is performed. Numeric characters provided to the respective arrows indicate process orders.

When learning of the neural network is performed, first, an image to be learned is identified. For example, processes of respective layers are sequentially executed on the image to be learned in the order of numeric characters "1" to "7" so as to output a processed result. When the learning of the neural network is performed, next, learning based on the identified result is performed. For example, as indicated by a numeric character "8", the identified result is compared with a correct answer so as to obtain errors. Label indicates the correct answer of the image to be learned. A process is executed which computes errors from the correct answer of the recognized result and error gradients of the respective layers in the order of numeric characters "9" to "17". As indicated by numeric characters "18" and "19", a process for changing parameters of each hierarchy is executed.

FIG. 12 is a diagram illustrating one example of a conventional used memory amount. The example illustrated in FIG. 12 indicates a used memory amount when input data is divided into 64 data units (batch size M=64) and the processes of the neural network illustrated in FIG. 11 are executed thereon. In the example illustrated in FIG. 12, the total used memory amount increases more than twofold when learning of the hierarchical neural network is performed.

Figure 13:
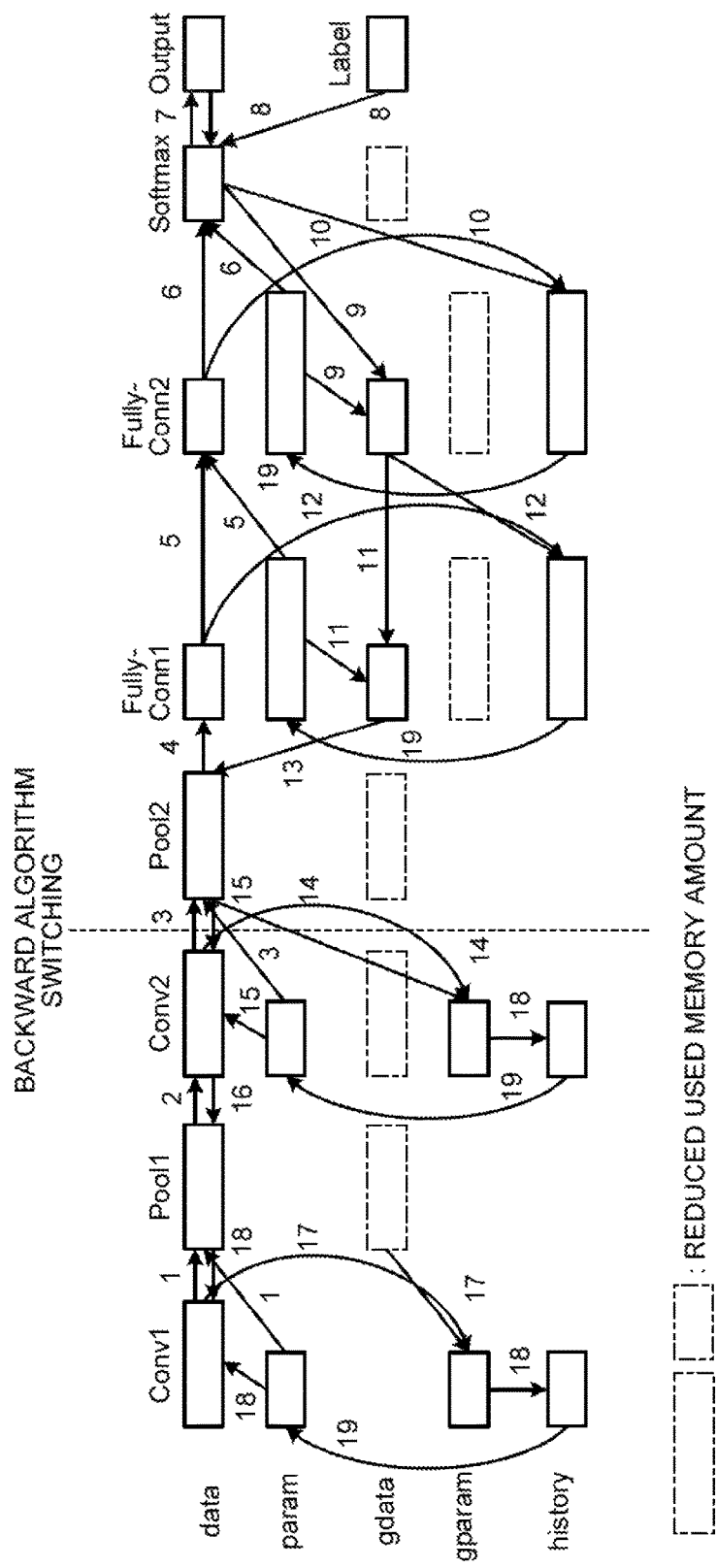
FIG. 13 is a diagram illustrating one example of a computation flow, using a momentum method, of the neural network according to the present embodiment.

Next, one example of a computation flow, using the momentum method, of the neural network according to the present embodiment will be explained. FIG. 13 is a diagram illustrating one example of a computation flow, using a momentum method, of the neural network according to the present embodiment. There is illustrated in FIG. 13 a computation flow in a case where the recognition apparatus 10 according to the present embodiment executes a neural network process using a momentum method similar to that illustrated in FIG. 11. Arrows indicate process flows when the learning of the neural network is performed. Numeric characters provided to the respective arrows indicate process orders.

When the learning of the neural network is performed, the recognition controlling unit 70 executes a recognizing process that identifies an image to be learned. For example, the recognition controlling unit 70 sequentially executes, similarly to the conventional neural network computation illustrated in FIG. 11, processes of respective layers in the order of numeric characters "1" to "7" so as to output (Output) a processed result. The learning controlling unit 71 executes a learning process for updating a parameter from errors of the identified result of the recognizing process. For example, as indicated by a numeric character "8", the recognition controlling unit 70 compares the identified result with a correct answer so as to obtain errors. The recognition controlling unit 70 sequentially computes error gradients of the respective layers as indicated by the order of numeric characters "9" to "19", so as to change the parameters. For example, the learning controlling unit 71 overwrites a memory area that holds the output result of the identification layer (Softmax) of the memory 60 with the error gradient of the output result computed on the basis of the output result from the identification layer (Softmax) held in the memory 60 so as to hold the error gradient. Thus, a memory area that memorizes the error gradient of the identification layer (Softmax) can be reduced compared with the conventional technology. For example, the learning controlling unit 71 saves, as indicated by numeric characters "9" and "11", the error gradients of the neuron data in the memory 60. As indicated by numeric characters "10" and "12", the learning controlling unit 71 computes an error gradient of the parameters, and overwrites therewith the memory area that holds error information of the previous cycle so as to save the error gradient. Thus, compared with the computation of the conventional neural network illustrated in FIG. 11, a memory area that memorizes the error gradient of the parameters of the first fully-connected layer (Fully-Conn1) and the second fully-connected layer (Fully-Conn2) is reduced. Thus, as indicated by a numeric character "14", the learning controlling unit 71 saves the error gradient of the parameters in the memory 60. As indicated by a numeric character "15", the learning controlling unit 71 computes an error gradient of the neuron data, and overwrites therewith the memory area that holds the error information of the previous cycle so as to save the error gradient. Thus, compared with the computation of the conventional neural network illustrated in FIG. 11, the memory area that memorizes the error gradient of the neuron data of the second convolution layer (Conv2) is reduced.

FIG. 14 is a diagram illustrating one example of a memory amount used by the recognition apparatus according to the present embodiment. The example illustrated in FIG. 14 indicates a used memory amount when input data is divided into 64 data units (batch size M=64) and the processes of the neural network illustrated in FIG. 13 are executed thereon. As illustrated in FIG. 14, the recognition apparatus 10 can largely reduce the used memory amount in the learning. For example, in the example illustrated in FIG. 14, the used memory amount is reduced by 42.8% (=8720784/15254448) in all compared with the example illustrated in FIG. 12.

In the aforementioned embodiment, the case in which the neural network identifies the identification target imaged on the image is exemplified. However, is not limited thereto. For example, anything, such as a sound, may be an identification target, which can be an identification target of the neural network.

In the aforementioned embodiment, the case in which the Convolution Neural Network (CNN) is employed as the neural network is exemplified. However, is not limited thereto. For example, the neural network may be a neural network that can learn and recognize a time series, such as a Recurrent Neural Network (RNN). The RNN is an expanded CNN and performs the error backward propagation similarly to the CNN, and thus processes similar to those according to the present embodiment can be applied thereto.

In the aforementioned embodiment, the case in which the memory-amount computing unit 51 is provided to the processing unit 31 of the mother board 21 is exemplified. However, is not limited thereto. For example, the memory-amount computing unit 51 may be provided to the processing unit 61 of the accelerator board 22, and the memory-amount computing unit 51 of the processing unit 61 on the accelerator board 22 may compute the used memory amount that is used in memorizing the neuron data and the parameter for each layer of the neural network.

In the aforementioned embodiment, the case in which the used memory amount used in the identifying process and the learning process is computed before the start of the identifying process is exemplified. However, is not limited thereto. For example, the used memory amount used in the identifying process may be computed before a start of the identifying process, and, after the identifying process, the used memory amount used in the learning process may be computed before a start of the learning process.

Specific forms of distribution and integration of the configuration elements of the illustrated devices are not limited to those illustrated in the drawings, and all or some of the devices can be configured by separating or integrating the apparatus functionally or physically in any unit, according to various types of loads, the status of use, etc. For example, any of the process units of the overall control unit 50, the memory-amount computing unit 51, the recognition controlling unit 70, and the learning controlling unit 71 may be appropriately integrated. A process of each process unit may be appropriately separated into processes of a plurality of process units. Further, all or an arbitrary part of the processing functions performed in the process units can be realized by a central processing unit (CPU) and programs analyzed and executed by the CPU, or can be realized as hardware by a wired logic.

Image Recognizing Program

Figure 15:
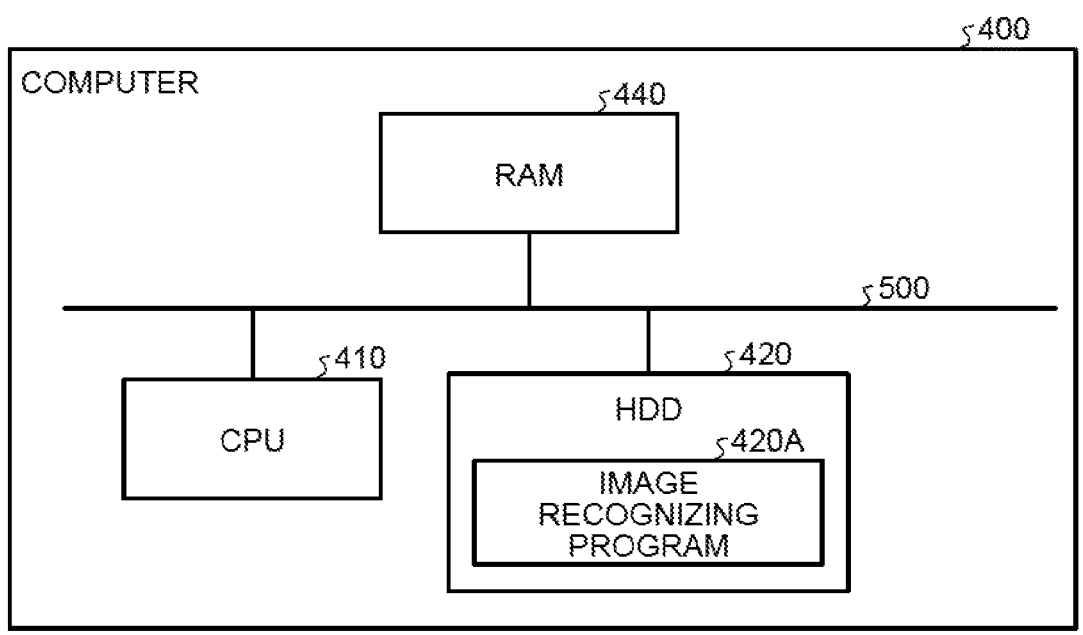
FIG. 15 is a diagram illustrating a configuration example of a computer that executes an image recognizing program.

The various kinds of processes having been explained in the aforementioned embodiment can be also realized by execution of previously prepared programs by a computer system such as a personal computer and a workstation. Therefore, hereinafter, one example of a computer system that executes an image recognizing program assisting the operation will be explained. FIG. 15 is a diagram illustrating a configuration example of a computer that executes an image recognizing program.

As illustrated in FIG. 15, a computer 400 includes a Central Processing Unit (CPU) 410, a Hard Disk Drive (HDD) 420, and a Random Access Memory (RAM) 440. These units 400 to 440 are connected one another by using a bus 500.

The HDD 420 preliminary memorizes an image recognizing program 420A that exerts functions similar to those of the overall control unit 50, the memory-amount computing unit 51, the recognition controlling unit 70, and the learning controlling unit 71, which are described above. The image recognizing program 420A may be appropriately divided.

The HDD 420 memorizes various kinds of information. For example, the HDD 420 memorizes, similarly to the memory 20, an OS, various programs, and various kinds of information.

The CPU 410 reads and executes the image recognizing program 420A from the HDD 420 so as to perform an operation similar to that of each of the process units according to the embodiment. In other words, the image recognizing program 420A performs operations similar to those of the overall control unit 50, the memory-amount computing unit 51, the recognition controlling unit 70, and the learning controlling unit 71.

It is sufficient that the aforementioned image recognizing program 420A is not previously memorized in the HDD 420. For example, the image recognizing program 420A may be memorized in "portable physical medium" such as a Flexible Disk (FD), a Compact Disc Read Only Memory (CD-ROM), a Digital Versatile Disc (DVD), a magnet-optical disk, and an Integrated Circuit card (IC card), which are to be inserted into the computer 400. The computer 400 may read therefrom and execute the program.

Moreover, the program may be memorized in, for example, "another computer (or server)" to be connected with the computer 400 through a public line, the Internet, a Local Area Network (LAN), a Wide Area Network (WAN), etc. The computer 400 may read therefrom and execute the program.

According to one aspect of the embodiments, a used memory amount in learning is able to be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image recognizing apparatus comprising a processor that executes a process comprising:
    controlling a first recognizing process in first layers, the first recognizing process comprising:
        computing convolution amounts based on neuron data and parameters of an input image to hold the convolution amounts in each of first memory areas of the corresponding first layer; and
        obtaining thinned convolution amounts by executing a thinning process on the convolution amounts held in the first memory area to hold the thinned convolution amounts in a corresponding one of second memory areas;
    controlling a second recognizing process in second layers, the second recognizing process including:
        obtaining output results by multiplying weights held in a corresponding one of third memory areas of the corresponding second layer by all of the thinned convolution amounts held in the corresponding one second memory area to hold the output results in a corresponding one of fourth memory areas;
    computing, for each of the first and second layers, a neuron data size that is a size of neuron data and a parameter size that is a size of a parameter; and
    controlling first learning process in the second layers and second learning process between the first layers, the first learning process in the second layers comprising:
        holding, in a fifth memory area, an error gradient of the output results computed based on the output results held in the fourth memory area;
        holding, in a sixth memory area of each layer of the second layers, an error gradient to be sent to the corresponding layer of the second layers, which is computed based on the error gradient of the output results held in the fifth memory area or an error gradient held in a sixth memory area of a previous layer of the second layers, based on a large/small relation between the neuron data size and the parameter size of the second layer; and then
        holding, in one of the third memory areas, an error gradient of parameters to be sent to the corresponding layer of the second layers, and
    the second learning process between the first layers comprising:
        holding, in a seventh memory area of each first layers, an error gradient of parameters to be sent to the corresponding layer of the first layers, which is computed based on the error gradient held in the sixth memory area or an error gradient held in a seventh memory area of a previous layer of the first layers, based on a large/small relation between the neuron data size and the parameter size of the first layer; and then
        holding, in one of the second memory areas, an error gradient to be sent to the corresponding layer of the first layers.

2. The image recognizing apparatus according to claim 1, wherein
    the controlling first learning process and second learning process includes:
    when the neuron data size is larger than the parameter size, controlling to execute the second learning process; and
    when the neuron data size is equal to or less than the parameter size, controlling to execute the first learning process.

3. The image recognizing apparatus according to claim 1, wherein
    the process further comprises controlling a process for normalizing the output results held in the fourth memory areas to hold the normalized output results in an eighth memory area, and
    the first learning process further comprises:
        overwriting the eighth memory area, instead of the fifth memory area, with error gradients of the output results computed based on the normalized output results held in the eighth memory area to hold the error gradients in the eighth memory area;
        holding, in the sixth memory area of each layer of the second layers, an error gradient to be sent to the corresponding layer of the second layers, which is computed based on the corresponding one of the error gradients of the normalized output results held in the eighth memory area or an error gradient held in a sixth memory area of a previous layer of the second layers, based on the large/small relation between the neuron data size and the parameter size of the second layer; and
        holding, in one of the third memory areas, an error gradient of parameters to be sent to the corresponding layer of the second layers.

4. The image recognizing apparatus according to claim 1, wherein the process further comprises overwriting, when the thinning process is executed on each layer of the first layers, the corresponding second memory area with an error gradient to be sent to a next layer of the corresponding layer to hold the error gradient in the corresponding second memory area.

5. A non-transitory computer-readable recording medium having stored therein an image recognizing program that causes a computer to execute a process comprising:
  controlling a first recognizing process in first layers, the first recognizing process comprising:
    computing convolution amounts based on neuron data and parameters of an input image to hold the convolution amounts in each of first memory areas of the corresponding first layer; and
    obtaining thinned convolution amounts by executing a thinning process on the convolution amounts held in the first memory area to hold the thinned convolution amounts in a corresponding one of second memory areas; and
  controlling a second recognizing process in second layers, the second recognizing process comprising:
    obtaining output results by multiplying weights held in a corresponding one of third memory areas of the corresponding second layer by all of the thinned convolution amounts held in the corresponding one second memory area to hold the output results in a corresponding one of fourth memory areas;
  computing, for each of the first and second layers, a neuron data size that is a size of neuron data and a parameter size that is a size of a parameter; and
  controlling first learning process in the second layers and second learning process between the first layers,
    the first learning process in the second layers comprising:
      holding, in a fifth memory area, an error gradient of the output results computed based on the output results held in the fourth memory area;
      holding, in a sixth memory area of each layer of the second layers, an error gradient to be sent to the corresponding layer of the second layers, which is computed based on the error gradient of the output results held in the fifth memory area or an error gradient held in a sixth memory area of a previous layer of the second layers, based on a large/small relation between the neuron data size and the parameter size of the second layer; and then
      holding, in one of the third memory areas, an error gradient of parameters to be sent to the corresponding layer of the second layers, and
    the second learning process between the first layers comprising:
      holding, in a seventh memory area of each first layers, an error gradient of parameters to be sent to the corresponding layer of the first layers, which is computed based on the error gradient held in the sixth memory area or an error gradient held in a seventh memory area of a previous layer of the first layers, based on a large/small relation between the neuron data size and the parameter size of the first layer; and then
      holding, in one of the second memory areas, an error gradient to be sent to the corresponding layer of the first layers.

6. An image recognizing method comprising:
  controlling a first recognizing process in first layers, using a processor, the first recognizing process comprising:
    computing convolution amounts based on neuron data and parameters of an input image to hold the convolution amounts in each of first memory areas of the corresponding first layer; and
    obtaining thinned convolution amounts by executing a thinning process on the convolution amounts held in the first memory area to hold the thinned convolution amounts in a corresponding one of second memory areas; and
  controlling a second recognizing process in second layers, using the processor, the second recognizing process including:
    obtaining output results by multiplying weights held in a corresponding one of third memory areas of the corresponding second layer by all of the thinned convolution amounts held in the corresponding one second memory area to hold the output results in a corresponding one of fourth memory areas;
  computing, for each of the first and second layers, a neuron data size that is a size of neuron data and a parameter size that is a size of a parameter, using the processor; and
  controlling first learning process in the second layers and second learning process between the first layers, using the processor,
    the first learning process in the second layers comprising:
      holding, in a fifth memory area, an error gradient of the output results computed based on the output results held in the fourth memory area;
      holding, in a sixth memory area of each layer of the second layers, an error gradient to be sent to the corresponding layer of the second layers, which is computed based on the error gradient of the output results held in the fifth memory area or an error gradient held in a sixth memory area of a previous layer of the second layers, based on a large/small relation between the neuron data size and the parameter size of the second layer; and then
      holding, in one of the third memory areas, an error gradient of parameters to be sent to the corresponding layer of the second layers, and
    the second learning process between the first layers comprising:
      holding, in a seventh memory area of each first layers, an error gradient of parameters to be sent to the corresponding layer of the first layers, which is computed based on the error gradient held in the sixth memory area or an error gradient held in a seventh memory area of a previous layer of the first layers, based on a large/small relation between the neuron data size and the parameter size of the first layer; and then
      holding, in one of the second memory areas, an error gradient to be sent to the corresponding layer of the first layers.

* * * * *